United States Patent
Ozzie et al.

(10) Patent No.: US 8,290,926 B2
(45) Date of Patent: Oct. 16, 2012

(54) SCALABLE TOPICAL AGGREGATION OF DATA FEEDS

(75) Inventors: Raymond Ozzie, Seattle, WA (US); Eric Patey, Rockport, MA (US); Brian Lambert, Boston, MA (US); George Moromisato, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 12/691,130

(22) Filed: Jan. 21, 2010

(65) Prior Publication Data

US 2011/0179020 A1 Jul. 21, 2011

(51) Int. Cl.
*G06F 7/06* (2006.01)
*G06F 17/30* (2006.01)

(52) U.S. Cl. ........ 707/708; 707/731; 707/738; 707/749; 707/754; 707/769

(58) Field of Classification Search ........... 707/999.003, 707/999.007, 999.102, 999.107, 723, 769, 707/755, 781, 731, 738, 749, 754, 708
See application file for complete search history.

(56) References Cited

U.S. PATENT DOCUMENTS

| | | | |
|---|---|---|---|
| 7,917,840 B2 * | 3/2011 | Newman et al. | 715/208 |
| 2006/0074883 A1 | 4/2006 | Teevan et al. | |
| 2007/0033170 A1 | 2/2007 | Sull et al. | |
| 2007/0156809 A1 | 7/2007 | Dickinson et al. | |
| 2007/0214097 A1 | 9/2007 | Parsons et al. | |
| 2007/0288431 A1 | 12/2007 | Reitter et al. | |
| 2008/0109419 A1 | 5/2008 | Murakami et al. | |
| 2008/0147487 A1 | 6/2008 | Hirshberg | |
| 2009/0063643 A1 | 3/2009 | Setiawan et al. | |
| 2009/0106202 A1 | 4/2009 | Mizrahi | |
| 2011/0113059 A1 * | 5/2011 | Lee et al. | 707/769 |

OTHER PUBLICATIONS

"Yahoo Pipes to Aggregate, Filter Multiple Feeds"—Published Date Dec. 3, 2008 http://www.kisaso.com/yahoo-pipes-to-aggregate-filter-multiple-feeds/.
Catone; Josh, "6 Ways to Filter Your RSS Feeds"—Published Date: Mar. 4, 2008 http://www.readwriteweb.com/archives/6_ways_to_filter_your_rss_feeds.php#.
"AggregateFeeds"—Published Date: Oct. 13, 2004 http://intertwingly.net/wiki/pie/AggregateFeeds.
"Using Yahoo Pipes to Aggregate Shared Items in Google Reader"—Published Date: Feb. 12, 2008 http://labs.justsearching.co.uk/using-yahoo-pipes-to-aggregate-shared-items-in-google-reader-257.html.
"Azure Feeds"—Retrieved Date: Oct. 23, 2009 http://azurefeeds.com/About.aspx.
International Search Report cited in PCT Application No. PCT/US2011/020181 dated Aug. 12, 2011.

* cited by examiner

*Primary Examiner* — Bruce Moser
(74) *Attorney, Agent, or Firm* — Microsoft Corporation

(57) ABSTRACT

Data items of various data feeds (such as articles posted to a website or entries in an RSS feed) may be associated with various topics, but a user may be unable to monitor a large number of data feeds, and to avoid previously reviewed data items while searching for new data items. An aggregation service may monitor many data feeds, perform an automated topical evaluation of the data items, and generate a set of topical data feeds. Additional services may also be applied, such as filtering the topical data feeds by various criteria, translating data items from a native language into another language, and removing equivalent data items, such as articles redundantly covering the same news story. A centralized or cooperatively distributed service may scale for improved efficiency and value, since each data feed may be monitored and each data item received and evaluated on behalf of many users.

19 Claims, 12 Drawing Sheets

SCALABLE TOPICAL AGGREGATION OF DATA FEEDS

BACKGROUND

In many computing scenarios, a user may express an interest in a set of data feeds relating to a particular topic. For example, a user may read a set of articles on a website about a particular topic, or may subscribe to a news website with a subscription request to be notified of new articles on a particular topic. Because many data sources (such as websites or newsgroups) may offer one or more data feeds (such as channels or sections of the website, or subgroups within a newsgroup), with each data feed offering many data items (such as articles or comments posted on the website, or replies posted to the newsgroup), a user may have to visit various data sources on a frequent basis in order to stay informed of commentary about the topic.

Some applications may be used to consolidate the data items of one or more data feeds, and may notify the user upon receiving a new data item. However, if each data feed comprises many data items, the user might have to review a large volume of data items, of which many might not pertain to topics of interest to the user. Moreover, the user may be reluctant to expand the number of data feeds that are followed, and may therefore miss some topically related data items of data feeds that the user has elected not to follow.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In order to monitor the data items of many data feeds, a user may endeavor to filter the aggregated set of data items, such as by examining only data items that include a particular keyword, that use a particular topical identifier (such as a Twitter hashtag), or that link to a particular webpage or website. However, this filtering mechanism may be inefficient in many aspects. First, some data items might relate to a topic in ways that are not captured by a simple filter; e.g., a topically related post on a website might use an acronym or synonym instead of a keyword. While more insightful contextual analysis might be achievable (e.g., through natural-language parsing and language translation algorithms), it might be inefficient to perform computationally intensive analysis on a large set of data items on behalf of a single user. Second, the user may not be permitted to monitor some data sources on an automated basis; e.g., the acceptable use policy of a website might disallow automated polling of the contents of the website, and might blacklist or refuse service to the user if polling is detected. Third, even for data sources that the user is permitted to monitor on an automated basis, it may be inefficient or prohibitive to allocate sufficient bandwidth to receive a potentially large number of data feeds having a potentially large number of data items. The network transport costs of receiving such a large set of data items on a continuous basis may be unacceptable for the scenario of monitoring the data feeds for topically related data items.

Techniques may be utilized to improve the efficiency and accuracy of identifying topically oriented data items in a set of data feeds offered by various data sources, and of generating a topical data feed comprising an aggregation of such topical data items. These techniques involve aggregating the topical interests of a set of users (potentially a very large set), and performing the topical analysis of data items and the generation of topical data feeds. This aggregation may yield some scaling advantages. In particular, it may be more efficient to perform the evaluation (including monitoring a large number of data sources and data feeds, and retrieving and analyzing a large set of data items) on behalf of a potentially large set of users, and potentially large set of topics. Scaling the results of these techniques to supply information to many users may make feasible the network transport costs of broadscale monitoring of many data sources, and/or the costs of the computational resources for performing a sophisticated topical analysis of respective data items. Moreover, one or more data sources may be more willing to permit automated polling in the context of these techniques, since such polled data items may be disseminated to a large number of users while conserving the bandwidth usage of the data source. By configuring a device to receive the data items of various data feeds, to identify topics associated with such data items, and to generate topical data feeds therefrom that may be provided to a set of users, the techniques discussed herein may achieve these and other advantages as compared with other techniques.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
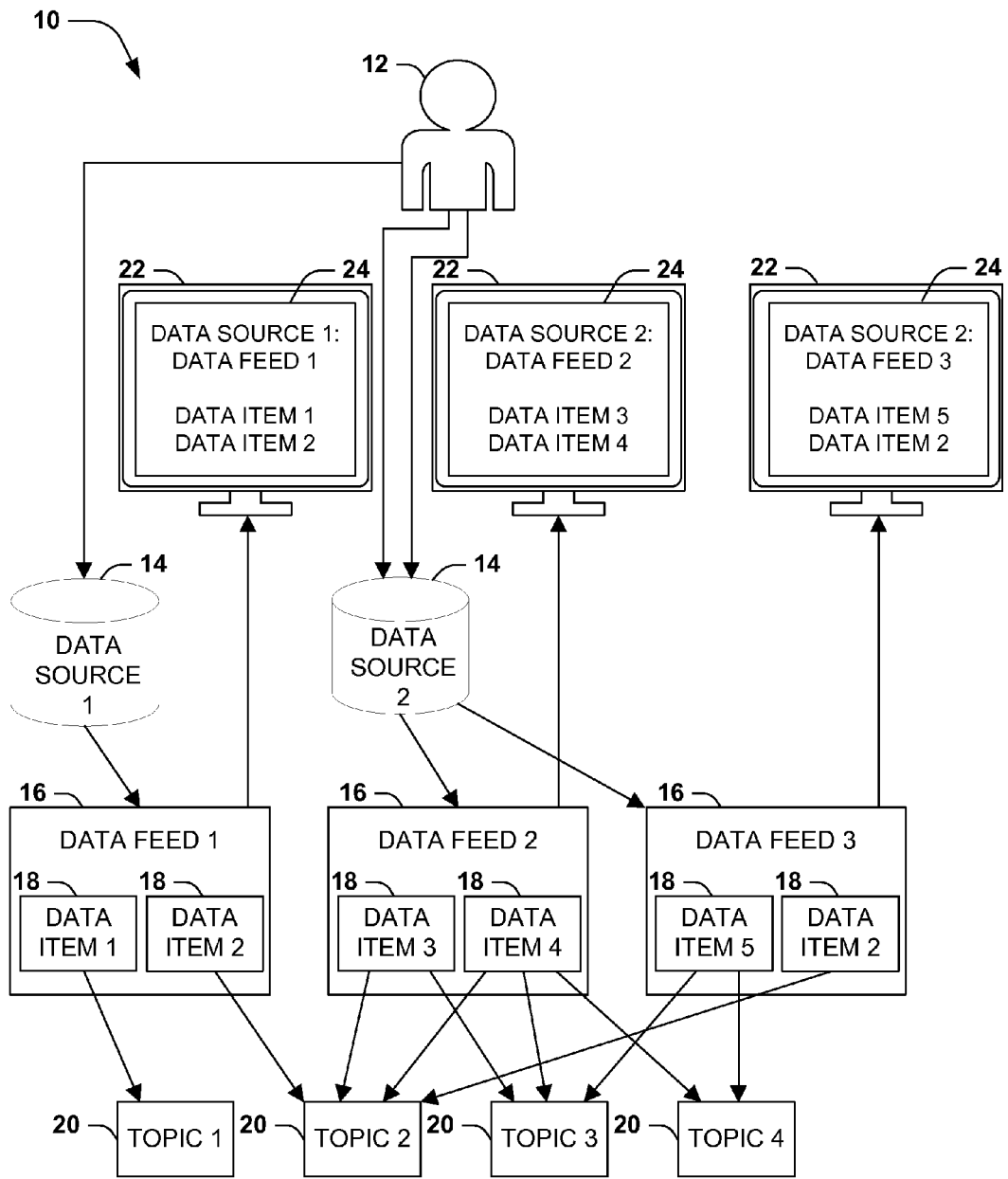
FIG. 1 is an illustration of an exemplary scenario featuring a user examining various data sources to identify data items relating to particular topics.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a user who wishes to follow one or more data feeds offered by one or more data sources in order to remain informed as to one or more topics. As a first example, the user may visit a set of websites in order to read articles, forum posts, comments, etc. that pertain to various topics, some of which may be of interest to the user. As a second example, the user may subscribe to one or more Really Simple Syndication (RSS) feeds and/or newsgroups, and may examine received data items for relevance to topics of interest. As a third example, the user may wish to examine a local data source for particular topics; e.g., the user may monitor an email account for email messages relating to various topics of interest, and may examine received email messages for relevance thereto. In these and other scenarios, one or more data sources (such as individuals or groups of individuals, companies or organizations, and automated devices) may present data items (such as authored content, articles, reports, photos, automated log entries, and data sets) in one or more data feeds (such as website sections, mailing lists, databases, and RSS or similar feeds); each data item may relate to one or more topics, and a user may wish to be presented with data items relating to a particular subset of topics.

In order to achieve this presentation, users may access the data sources and data feeds in a variety of manners. FIG. 1 presents a first exemplary scenario 10 featuring a user 12 who wishes to stay informed of various topics 20, which may be covered by various data items 18 presented in a set of data feeds 16 offered by various data sources 14. A familiar example of this first exemplary scenario 10 involves a set of web servers (operating as data sources 14), each of which may offer one or more web pages or sections of the website (each web page or section corresponding to a data feed 16.) Each web page or section offers various articles, user posts or comments, photos, audio and/or video recordings, data objects, data sets, etc. (each comprising a data item 18), and each such item may be associated with one or more topics 20 of interest to the user 12.

In order to view such data items 18 and keep informed of such topics 20, the user 12 may choose to access each data feed 16 in series, and may actively review a presentation 24 of the data feed 16, such as on a display 22 of a device operated by the user 12 (e.g., a desktop computer, a portable computer such as a notebook, or a mobile device such as a smartphone.) In the familiar example of the presentation of web browsing, the user 12 may choose to view each web page or section in a web browser. Upon receiving a request from the user 12, a webserver (operating as a data source 14) may render the requested web page or section comprising the current set of data items 18, and may present this rendering to the user 12 within the web browser displayed on a monitor 22. For example, the user 12 may enter a URL associated with a first webserver, which may offer a first section (e.g., posts by a particular first author, such as the author of a first weblog), including a first data item 18 involving a first topic 20 and a second data item 18 involving a second topic 20. The web page generated by the first webserver may be displayed to the user 12 on a display 22 as a first presentation 24, which may include the first data item 18 and the second data item 18. Next, the user 12 may enter a URL associated with a second webserver, which may offer a first website section featuring a third data item 18 and a fourth data item 18, each data item 18 associated with a different set of topics. After viewing the second presentation 24 on the display 22, the user 12 may enter another URL associated with the second webserver that identifies a different section of the same website (comprising a third data feed 16), and the second webserver may generate for the user 12 a third presentation 24 comprising the data items 18 of the third data feed 16. In this manner, the user 12 may request to access the data feeds 16 in an ad-hoc manner, may receive a presentation 24 of the current set of data items 18 comprising the data feed 16, and may identify and keep informed of the topics 20 related thereto.

The first exemplary scenario 10, while familiar, exhibits some potential disadvantages with respect to other scenarios. As a first example, because the user 12 identifies and actively accesses the data sources 14, the scope of data items 18 that are accessible to the user 12 is limited to the set of data sources 14 known to and queried by the user 12. For example, the user 12 may fail to be presented with data items 18 presented by data sources 14 that are unknown to the user 12, or that are known to the user 12 but that have not been queried since such data items 18 were presented. Conversely, the user 12 has to query respective data feeds 16 without knowing if any data items 18 of interest to the user 12 are featured therein. For example, the user 12 may repeatedly access a data feed 16 that does not include any new data items 18 since the previous accessing, or that includes only new data items 18 that are not of interest to the user 12. As a second example, the user 12 might also be redundantly presented with semantically equivalent data items 12 in different data feeds 16 (e.g., two news websites present or link to the same article.) For example, the user 12 is presented the second data item 18 twice—once as part of the first data feed 16, and once as part of the third data feed 16. This may cause frustration to the user 12 in being repeatedly presented with the dame data item 18 in multiple data feeds 16. As a third example, it may be difficult for the user 12 to identify the topics 20 of the data items 18, in order to select and review those of interest to the user 12. For example, the user 12 may have to review all data items 18 in a particular data feed 16 in order to identify those of interest, including the context of each data item 18 (e.g., a second comment presented on a weblog may be responsive to a first comment, and may implicitly rely on the contextual content of the first comment, but this may be difficult for the user 12 to identify without having read the first comment.) These redundancies and inefficiencies may diminish the experience both for the user 12 (e.g., through lost time and bandwidth in reviewing old and uninteresting data items) and for the data source 14 (e.g., through redundantly serving web pages and items of little interest or novelty to the user 12.) For example, the user 12 may have no interest in the second topic 20, but may repeatedly receive and be presented with data items 18 related to the second topic 20, thereby inefficiently expending computational resources (such as bandwidth and memory) and the attention of the user 12. These disadvantages are not limited to web browsing, but may be exhibited in any scenario wherein the user 12 actively seeks content, such as newsgroups, event logs, and database queries.

Some of these disadvantages may be achieved through subscription techniques. As a first example, a user 12 may subscribe to a data feed 16 offered by a data source 14 in order to receive new data items 18 from the data source 14, instead of having to query the data source 14. The delivery of data items 18 may be initiated by the data source 14, as in a mailing list subscription involving a delivery of new email messages to the user 12, or may involve a mechanism deployed by the data source 14 for monitoring the data feed 16, such as a Really Simple Syndication (RSS) feed featuring a pollable data feed 16 that the user 12 may poll to identify and receive new data items 18. This subscription may reduce the active, user-directed requesting and presenting of the data feeds 16 in the absence of new data items 18, and may also notify the user 12 of new data items 18 even in the absence of user-directed refreshing. As a second example, the user 12 may consolidate the date items 18 received from various data sources 14 and data feeds 16 for access through a single user interface. For example, the user 12 may access email messages from many mailing lists through a single email client, or may access a set of RSS feeds through an RSS aggregator (e.g., through an aggregator application that executes locally on the computer of the user 12 to request multiple data feeds 16 and present the data items 18 of these data feeds 16 together, or through an aggregator service that a user 12 may visit to receive an aggregated data feed 16 generated from multiple data feeds 16 by the aggregator service.) By consolidating the data items 18 of many data feeds 16, the user 12 may more easily identify data items associated with a particular topic 20, e.g., by filtering email messages or RSS syndication items for a particular keyword in the subject or body of the message or item.

Figure 2:
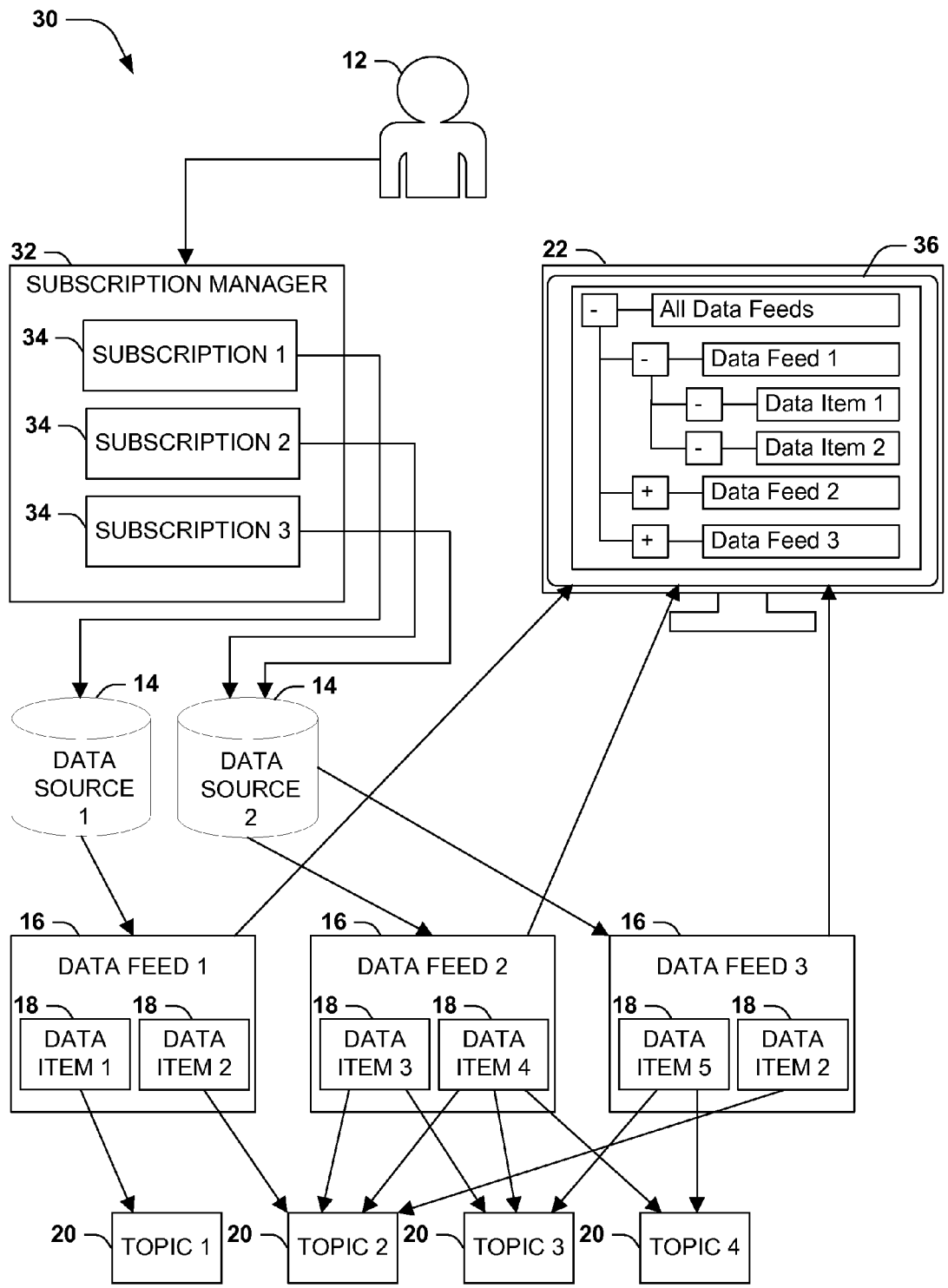
FIG. 2 is an illustration of an exemplary scenario featuring a user subscribing to various data sources in order to receive data items relating to particular topics.

FIG. 2 presents a second exemplary scenario 30 featuring some of these subscription techniques, which may promote the user experience in reviewing data items 18 related to one or more topics 20 of interest. In this second exemplary scenario 30, the user 12 may utilize a subscription manager 32 to request one or more subscriptions 34 to various data feeds 16, such as a first subscription 34 to the first data feed 16 offered by the first data source 14, and a second subscription 34 and a third subscription 34 to the second data feed 16 and a third data feed 16, both of which are offered by the second data source 14. The data sources 14 may accept and store these subscriptions 34, and upon receiving data items 18 in the data feeds 16 corresponding to these subscriptions 34, may deliver the data items 18 to the user 12 (e.g., by sending an email message to an email account accessible to the user 12.) Upon receiving these data items, a device operated by the user 12 may present these data items 18 to the user 12, such as by rendering on a display 22 an aggregated presentation 36 of the data items 18. In this exemplary scenario, a hierarchical presentation is rendered, comprising a tree view with the data feeds 16 displayed as a set of nodes, each comprising the data items 18 of the data feed 16 as a set of subnodes. The user 12 may therefore browse the data feeds 16 in a more convenient manner, without having to solicit the data sources 14 for new data items 18. Additionally, the device may present the user 12 with a list of new data items 18 in some or all data feeds 16, thereby reducing the redundant presentation of old data items 18 to the user 12 (as compared with the first exemplary scenario 10 of FIG. 1.) In this second exemplary scenario 30, the user 12 might also filter the entire set of data items 18 by one or more topics 20, such as by requesting a presentation of the data items 18 comprising a particular keyword.

While the second exemplary scenario 30 of FIG. 2 presents some advantages (particularly over the first exemplary scenario 30 of FIG. 1), some disadvantages may be identified. As a first example (similar to the first exemplary scenario 10 of FIG. 1), the user 12 remains limited to the set of data feeds 16 and data sources 14 that are known to the user 12, and still cannot view data items 18 involving topics 20 of interest that are posted to data feeds 16 and data sources 14 that are unknown to the user 12. As a second example, these techniques may only be utilized with data sources 14 that permit various forms of subscription, such as websites offering an RSS feed. Many data sources 14 may not offer a subscription service; e.g., a website administrator may decline to provide an RSS feed in order to compel users 12 to visit the website in order to promote advertising revenue. While the user 12 may endeavor to implement a subscription-like service for an unsubscribable data source 14 (e.g., by polling a website for new content), the data source 14 may preclude this accessing through its acceptable use policy, and may blacklist or otherwise deny access to users who violate this policy. As a third example, these subscription techniques involve the retrieval of all data items 18 posted to all data feeds 16, and may be unable to request a limitation of the retrieved data items 18 to those pertaining to a particular set of topics 20. This retrieval may be computationally expensive (e.g., utilizing significant bandwidth, storage, and/or processing), and it may be prohibitive to subscribe to and monitor many data feeds 16 having a large number of data items 18 (particularly if the user 12 is only interested in a small set of topics 20 covered by only a small portion of the received data items 18.) As a fourth example, identifying the topics 20 associated with various data items 18 in order to limit the presentation of data items 18 to the user 12 may be difficult. Simple techniques, such as keyword detection, may provide inaccurate results, particularly for topics 20 that are discussed by many natural language names. Conversely, sophisticated analytic techniques may be available, such as natural-language parsing, language translation for textual data items 18 presented in a foreign language, image analysis for data items 18 comprising images, and contextual analysis; however, the computational costs involved in the application of these techniques may be prohibitive. For example, it may be prohibitive to perform computationally intensive filtering of a large set of data items 18 in order to present the results to a single user 12.

In view of the potential disadvantages of these exemplary scenarios, techniques are presented herein for generating a set of topical data feeds for a set of users 12, where data items 18 aggregated from many data sources 14 may be subjected to a sophisticated topical analysis to identify topics 20 associated therewith and aggregated into a set of topical data feeds. These techniques may involve, e.g., a centralized service that offers a potentially large set of topical data feeds to a potentially large set of users. An embodiment of these techniques may receive data items 18 from a broad set of data feeds 16 and data sources 14, and may perform a computationally intensive analysis on respective data items 18 in order to identify topics 20 associated therewith. For various users 12, the service may receive a set of topics 20 that are of interest to the user 12, and may generate a set of topical data feeds comprising the data items 18 associated with the topics 20 identified by the user 12. These topical data feeds may be presented to the user 12 in response to the specification of topics 20.

Figure 3:
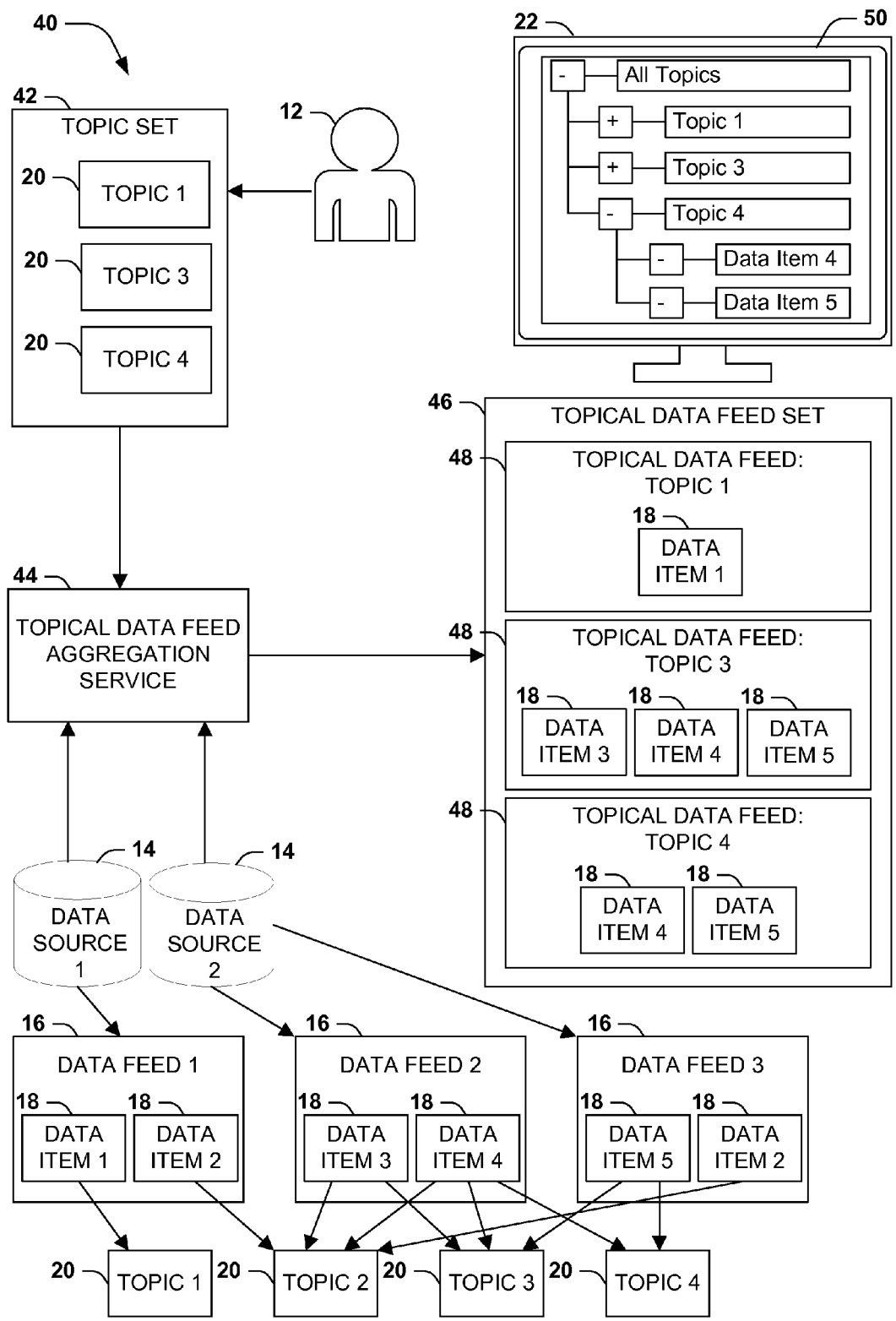
FIG. 3 is an illustration of an exemplary scenario featuring a user specifying a set of topics and receiving topical data feeds relating to such topics according to the techniques discussed herein.

FIG. 3 presents an exemplary scenario 40 featuring the presentation of topical data feeds to a user 12 according to the techniques discussed herein. In this exemplary scenario 40, a topical data feed aggregation service 44 is configured to access a set of data sources 14, each of which provides one or more data feeds 16 having a set of data items 18. The topical data feed aggregation service 44 may monitor such data feeds 16 for new data items 18, and upon receiving a new data item 18, may identify one or more topics 20 associated with each data item 18. The topical data feed aggregation service 44 may then receive from a user 12 a topic set 42, comprising a set of topics 20 that are of interest to the user 12. For each topic 20 specified by the user 12, the topical data feed aggregation service 44 may select the data items 18 that are associated with the topic 20, and may generate a topical data feed 48 comprising the data items 18 associated with the topic 20. For example, a first topical data feed 48 may be generated comprising the first data item 18; a second topical data feed 48 may be generated comprising the third, fourth, and fifth data items 18 associated with the third topic 20; and a third topical data feed 48 may be generated comprising the fourth and fifth data items 18 associated with the fourth topic 48. These topical data feeds 48, comprising a topical data feed set 46, may be delivered to the user 12 for presentation, e.g., on a display 22 of a device operated by the user 12. For example, a tree view presentation 50 may be displayed where each topic 20 is included as a node, comprising as subnodes the data items 18 associated with the topic 20. In this manner, the topical data feeds 48 may be generated and delivered to the user 12 in response to the topics 20 of interest to the user 12.

A service configured according to the techniques presented herein (including the exemplary scenario 40 of FIG. 3) may present some advantages and/or may reduce disadvantages as compared with other techniques (including the exemplary scenarios of FIGS. 1 and 2.) A service configured in this manner may achieve higher economies of scale than single-user techniques by aggregating the receipt and analysis of data items 18 on behalf of a potentially large set of users 12. Sufficiently broad-user-base scaling of these techniques may render feasible a broad survey of many data sources 14 and data feeds 16, and a comparatively sophisticated automation of the topical analysis of each data item 18 (including natural language analysis, language translation of textual data items 18 presented in a foreign language, image analysis for image-based data items 18, and contextual analysis among related data items 18). Some embodiments of these techniques may also add value to the topical data feeds 48, e.g., by further grouping data items 18 in a topical data feed 48 by subtopic; by ranking data items 18 in terms of predicted value or reliability; by removing old, redundant, or inaccurate data items 18; or by translating data items 18 into a native language of the user 12. Additionally, if the service is configured to service a large number of users 12, the service may have sufficient leverage to broker a subscription mechanism with a particular data source 12 that single users may be unable to achieve; e.g., a service may offer to undertake the bandwidth expenses of disseminating data items 18 from a particular data source 14 to a large set of users 12, and may therefore compel the data source 14 to offer a subscription mechanism (such as an exception to a polling restriction in the acceptable use policy) that may be unavailable to single users 12.

For the user 12, the use of such a service, as compared with techniques implemented on behalf of a single user (such as the exemplary scenarios of FIGS. 1-2), may present several advantages. The user 12 may be presented with data items 18 from data sources 14 and data feeds 16 that are unknown to the user 12, or that the user 12 cannot regularly monitor. These techniques may also may reduce the burden and inefficiency to the user of actively polling the data sources 14 in an ad-hoc manner (e.g., having to visit many websites in order to remain informed of a topic 20, including visits to websites that have no new or interesting data items 18). In addition, the computational burdens of monitoring a large body of data feeds 16 and processing the data items 18 are removed from the user 12, and the user 12 may receive only the data items 18 that are of interest to the user 12. As another potential advantage, the user 12 may be presented with a more accurate topical aggregation of data items 18 than may be otherwise achieved; e.g., a sophisticated topical analysis that may be achieved by a centralized service may be considerably more accurate than simpler topical analysis techniques that might be feasible on the user's device, such as keyword detection. The user 12 may also benefit from additional processing of the data feed 16, such as through automated translation of data items 18 into the native language of the user 12 and ranking of data items 18 by predicted value, that may be performed by the service without cost to the user 12.

Figure 4:
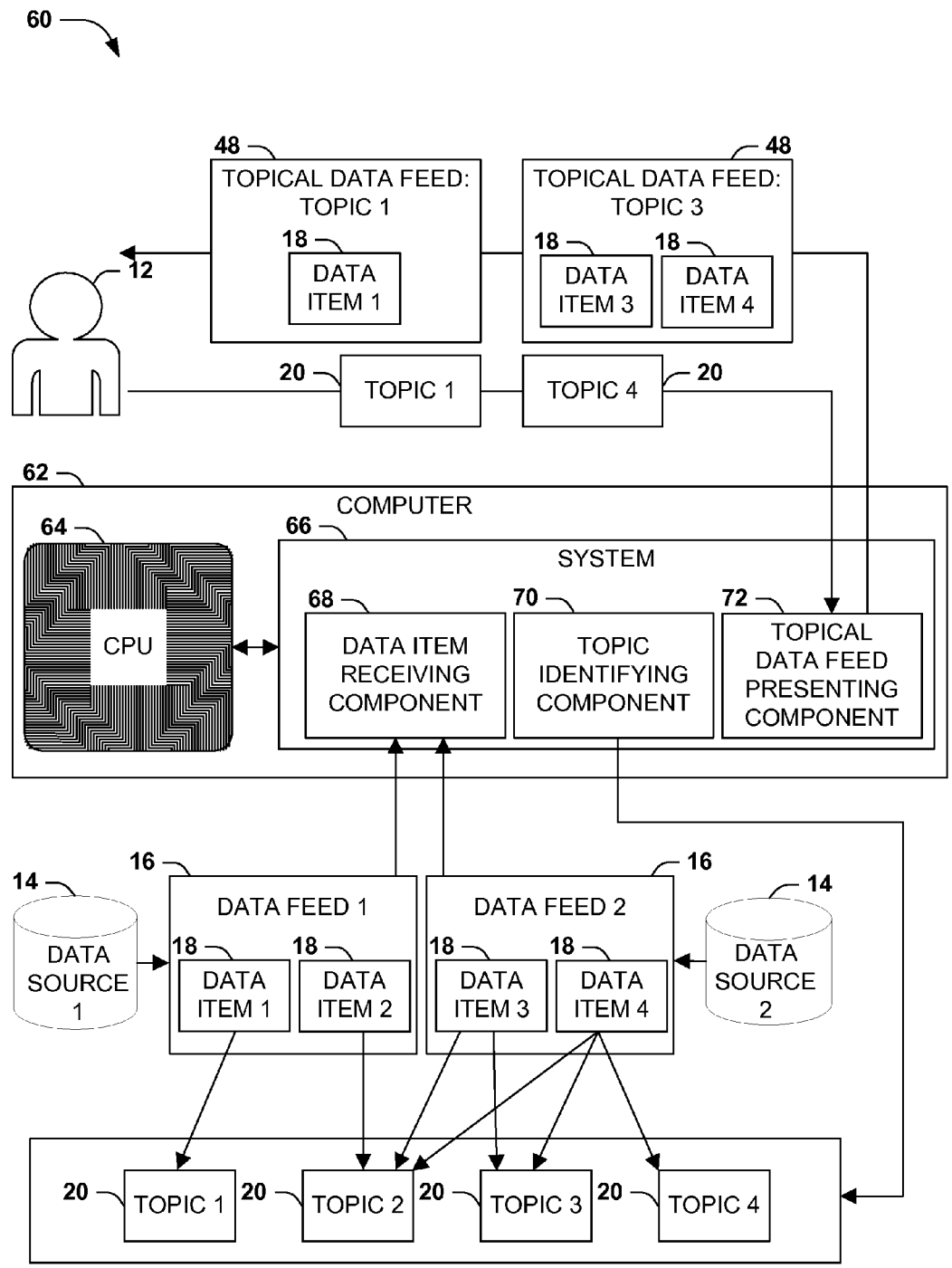
FIG. 4 is a component block diagram illustrating an exemplary system for presenting topical data feeds to users.

FIG. 4 presents a first exemplary embodiment of these techniques, illustrated as an exemplary system 66 configured to present topical data feeds 48 to a user 12. The exemplary system 66 operates on a computer 62 having a processor 64, and may be implemented, e.g., as software instructions executed on the processor 64, as hardware components such as circuits, and/or as hybrid devices such as field-programmable gate arrays (FPGAs) configured to perform the techniques discussed herein. The computer 62 also has access to one or more data sources 14, where each data source 14 provides at least one data feed 16 comprising at least one data item 18. The computer 62 is also accessible to a user 12 who may be interested in various topics 20, and who may submit to the computer 62 a set of topics 20 that the user 12 wishes to monitor. In accordance with the techniques discussed herein, the exemplary system 66 includes a data item receiving component 68 that is configured to, for respective data feeds 16, receive the data items 18 from the data source 14 of the data feed 16. The exemplary system 66 also includes a topic identifying component 70 that is configured to, for respective data items 18, identify at least one topic 20 associated with the data item 18. The exemplary system 66 also includes a topical data feed presenting component 72 that is configured to receive from the user 12 at least one topic 20, and for respective topics 20, select the data items 18 associated with the topic 20, generate a topical data feed 48 comprising the data items 18 associated with the topic 20, and present the topical data feed 48 to the user 12. Having generated and presented to the user 12 a set of topical data feeds 48 comprising data items 18 that pertain to the topic 20 specified by the user 12, the exemplary system 66 therefore serves the interests of the user 12 regarding the specified topics 20.

Figure 5:
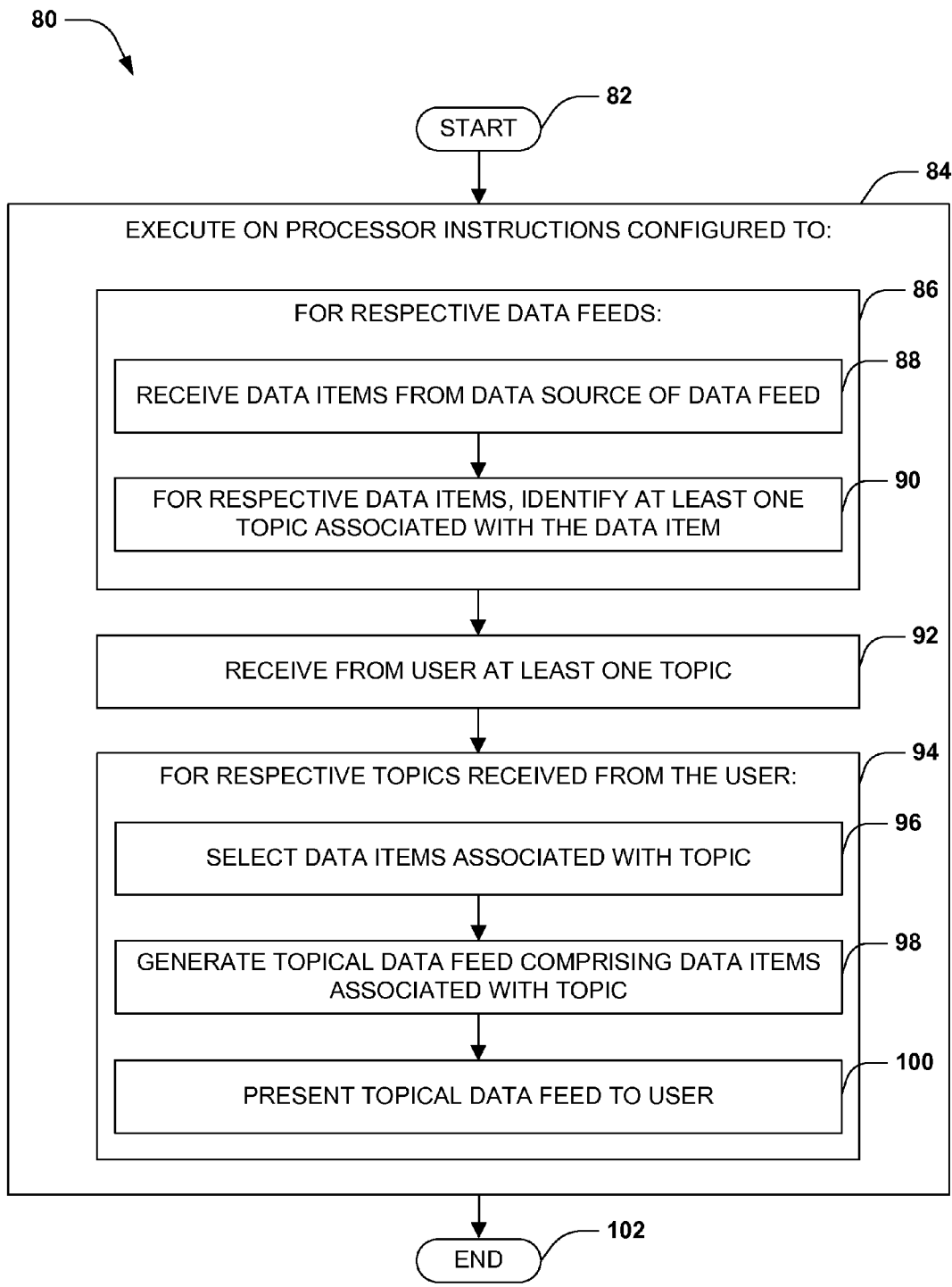
FIG. 5 is a flow chart illustrating an exemplary method of presenting topical data feeds to users.

FIG. 5 presents a second exemplary embodiment of these techniques, illustrated as an exemplary method 80 of presenting to users 12 at least one topical data feed 48 comprising data items 18 of at least two data feeds 16, where respective data feeds 16 are provided by at least one data source 14. The exemplary method 80 may be performed on a device having a processor 64, such as the computer 62 illustrated in FIG. 4. The exemplary method 80 begins at 82 and involves executing on the processor 64 instructions configured to perform the techniques presented herein. In particular, the instructions may be configured to, for respective data feeds 86, receive 88 the data items 18 from the data source 14 of the data feed 16, and for respective data items 18, identify 90 at least one topic 20 associated with the data item 18. The instructions may also be configured to receive 92 from a user 12 at least one topic 20, for respective topics received from the user 94, select the data items 18 associated with the topic 20, generate 98 a topical data feed 48 comprising the data items 18 associated with the topic 20, and present 100 the topical data feed 48 to the user 12. Having generated topical data feeds 48 based on the topics 20 received from the user 12 and presented the topical data feeds 48 to the user 12, the exemplary method 80 thereby services the interests of the user 12 regarding the specified topics 20, and so ends at 102.

Figure 6:
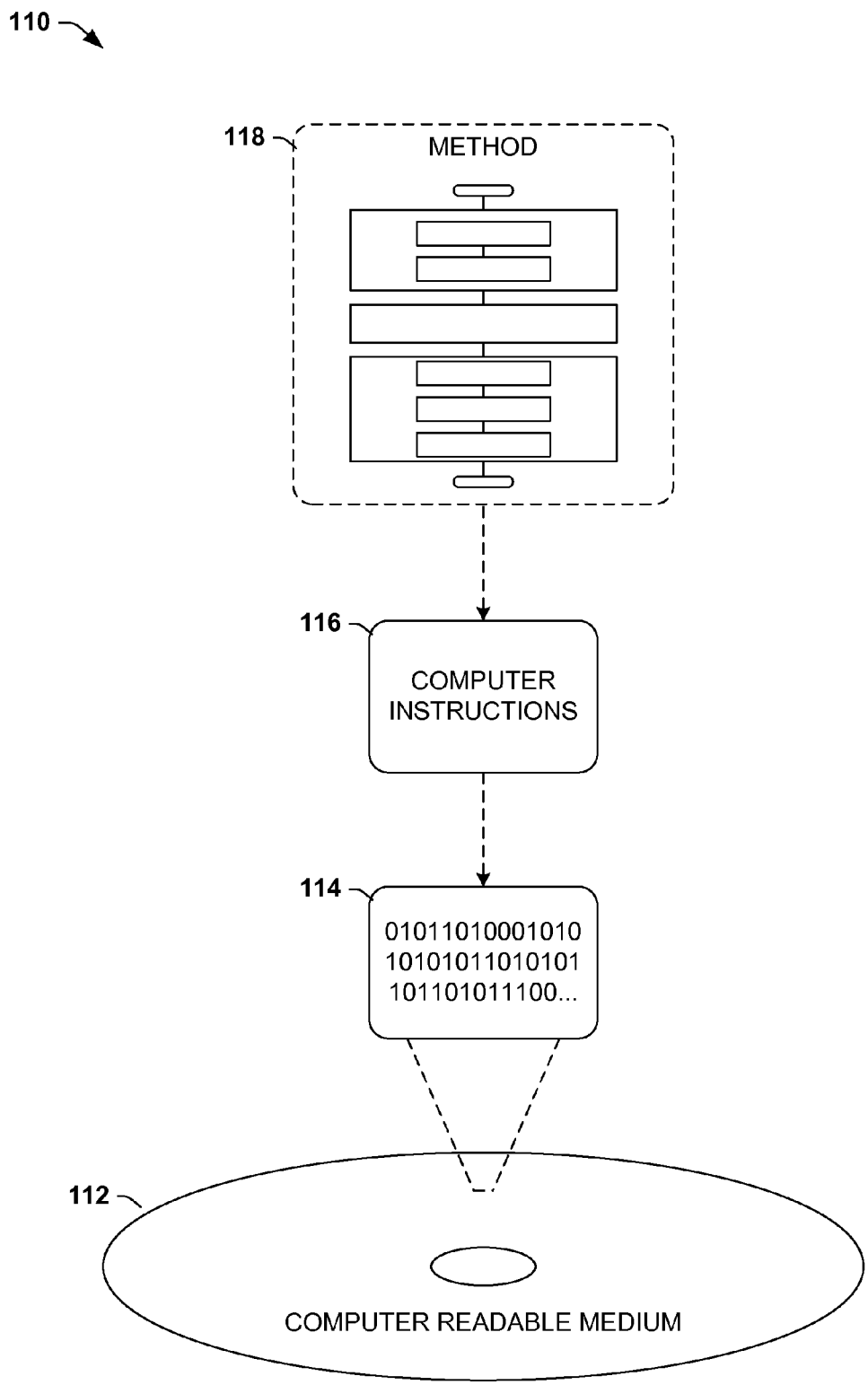
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to perform a method 118 of presenting topical data feeds to users, such as the exemplary method 80 of FIG. 5. In another such embodiment, the processor-executable instructions 116 may be configured to implement a system for presenting topical data feeds to users, such as the exemplary system 66 of FIG. 4. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 66 of FIG. 4 and the exemplary method 80 of FIG. 5) to confer individual and/or synergistic advantages upon such embodiments.

A first aspect that may vary among embodiments of these techniques relates to the scenarios in which the techniques may be utilized. As a first example, a user 12 to whom a topical data feed 48 is presented may comprise an individual, a group of individuals (acting collectively and/or independently), an entity such as a corporation or organization, a device, or an automated process. As a second example, the topics 20 associated with the data items 18 may comprise, e.g., individuals, locations, objects, events, or concepts. Moreover, one or more topics 20 may be represented in a particular manner, e.g., by a file, resource, or website, and/or may be identifiable in many ways, e.g., by a relative or distinctive name, a distinctive identifier, a hash value, a database key value, a globally unique identifier (GUID), or a uniform resource identifier (URI), such as a resource accessible through a Representational State Transfer (REST) service. As a third example, a data feed 16 may comprise data items 18 of many types, including text; media such as images, sound, or video; a digital object, such as a file or data set; a record or record set in a database; or a combination of such items. As a fourth example, the data feeds 16 may comprise many types of collections of data items 18, such as a human-readable and/or machine-parseable list, a database or a portion of a database, an event log or file, a structured document such as an Extensible Markup Language (XML) document, or a subscription format such as a Really Simple Syndication (RSS) data feed. As a fifth example, the data feeds 16 may be provided by many types of data sources 14, such as a file server, a webserver, a database server, or a device having an output. Some examples of a data source 14, data feed 16, and data items 18 to which these techniques may be applied include a news webserver offering a news website comprising a set of news items; a forum webserver offering a web forum comprising a set of forum posts; a weblog server offering a weblog comprising a set of weblog entries; a data server offering a data feed (such as an RSS feed) comprising a set of data feed items; a fileserver offering a file store comprising a set of files; and a database server offering a database comprising a set of data records. Those of ordinary skill in the art may recognize many scenarios wherein the techniques discussed herein may be advantageously utilized.

A second aspect that may vary among embodiments of these techniques relates to the architectures of such embodiments. FIG. 4 illustrates an exemplary architecture of one embodiment, wherein the techniques are implemented as a system 66 operating on a processor 64 of a computer 62 and comprising a data item receiving component 68, a topic identifying component 70, and a topical data feed presenting component 72. However, those of ordinary skill in the art may select many architectures for an embodiment of these techniques, and some architectures may present advantages and/or reduce disadvantages with respect to other architectures. As a first example of this second aspect, the techniques (such as the logic illustrated in the exemplary method 80 of FIG. 5) may be implemented as software comprising a set of instructions that may be executed on a general-purpose processor 64 of a general-purpose computer. The instructions may be partially or wholly customized for a particular computer 62 or a particular processor 64 (e.g., the instructions may take advantage of architectural features of a particular computer 62 or specialized instructions of a graphics processor 64.) Such instructions may be stored in volatile memory (e.g., system RAM) or in partially or wholly non-volatile memory (e.g., a cache stored on a hard drive, a read-only optical disc, or rewritable flash memory.) Alternatively or additionally, the techniques may be implemented partially or wholly in hardware, such as a circuit configured to perform the exemplary method 80 of FIG. 5, or a programmable field gate array (FPGA) that is configured to implement the exemplary system 66 of FIG. 4.

As a second example of this second aspect, the techniques may be implemented in many types of computers 62, such as a server, a workstation, a portable computer such as a notebook, a device such as a mobile phone, or a circuit operating in a standalone device. The computer 62 might also comprise a virtual machine executing on another device, such as a software implementation in Java executing within a Java virtual machine that is represented within the computing environment of a device. The computer 62 may also comprise more than one device, such as a set of computers collaborating (such as over a network) to receive the data items 18 and to present the topical data feeds 48. For example, in a first collaborative embodiment, the receiving of data items 18 may be performed by a server, which may present the topical data feeds 48 by transmitting them to a device operated by the user 12 for rendering on a display coupled to the device. Alternatively, in a second collaborative embodiment, the server may present to the client device the set of data items 18 associated with topics 20, and the client device may generate topical data feeds 48 therefrom for presentation to the user 12. In a third collaborative embodiment, various portions of the processing may be distributed; e.g., a set of client devices, operating together in a peer-to-peer network, may collaborate to receive of data items 18 that are shared with other peers, and/or the processing involved in associating data items 18 with topics 20 may be distributed over a set of client devices. A collaborative, peer-to-peer network might be advantageous, e.g., for distributing the bandwidth and processing costs of these techniques over a large set of devices, some or all of which may be operated by users 12, and/or for improving the reliability and speed of these techniques through broadly concurrent processing.

As a third example of this second aspect, a particular scenario relating to the architecture of embodiments of these techniques involves the presentation of topical data feeds 48 to a user 12 of a set of devices represented in a deployable computing environment. Recent attempts have been made to develop techniques for providing access to a computing environment among an array of devices in a consistent, deployable, and extensible manner. These techniques also seek to provide automated synchronization of data objects among all such devices, and the deployment of a common set of applications among the cooperating devices, and a centralized service for managing the procuring, installing, using, and uninstalling of applications among such devices. The set of data objects and applications is not necessarily identical among various devices; e.g., a workstation may contain a full copy of the data set and a large number of high-performance applications (e.g., photo editing software and graphically intensive games), while a cellphone device (having a smaller data store) may store only a subset of the data objects, and may feature portability applications (e.g., a GPS-based mapping software) that are not relevant to a non-portable workstation. However, many applications and data objects related thereto may be shared among such devices (e.g., a calendar application configured to manage a user calendar object), and the computing environment may be adapted to enable the distribution and synchronization of the application and data objects among such devices. It may therefore be appreciated that a computer system may be advantageously represented in a manner that enables the deployment of the computing environment among a set of devices.

In one such technique, the computing environment—including a set of applications, the application resources, and data objects used thereby—is represented in a manner that may be delivered to devices for rendering according to the capabilities of the device. The objects include the data objects of the computer system, such as the user files and data created by the user, as well as representations of the myriad devices comprising the computing environment of the user. A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered.

Figure 7:
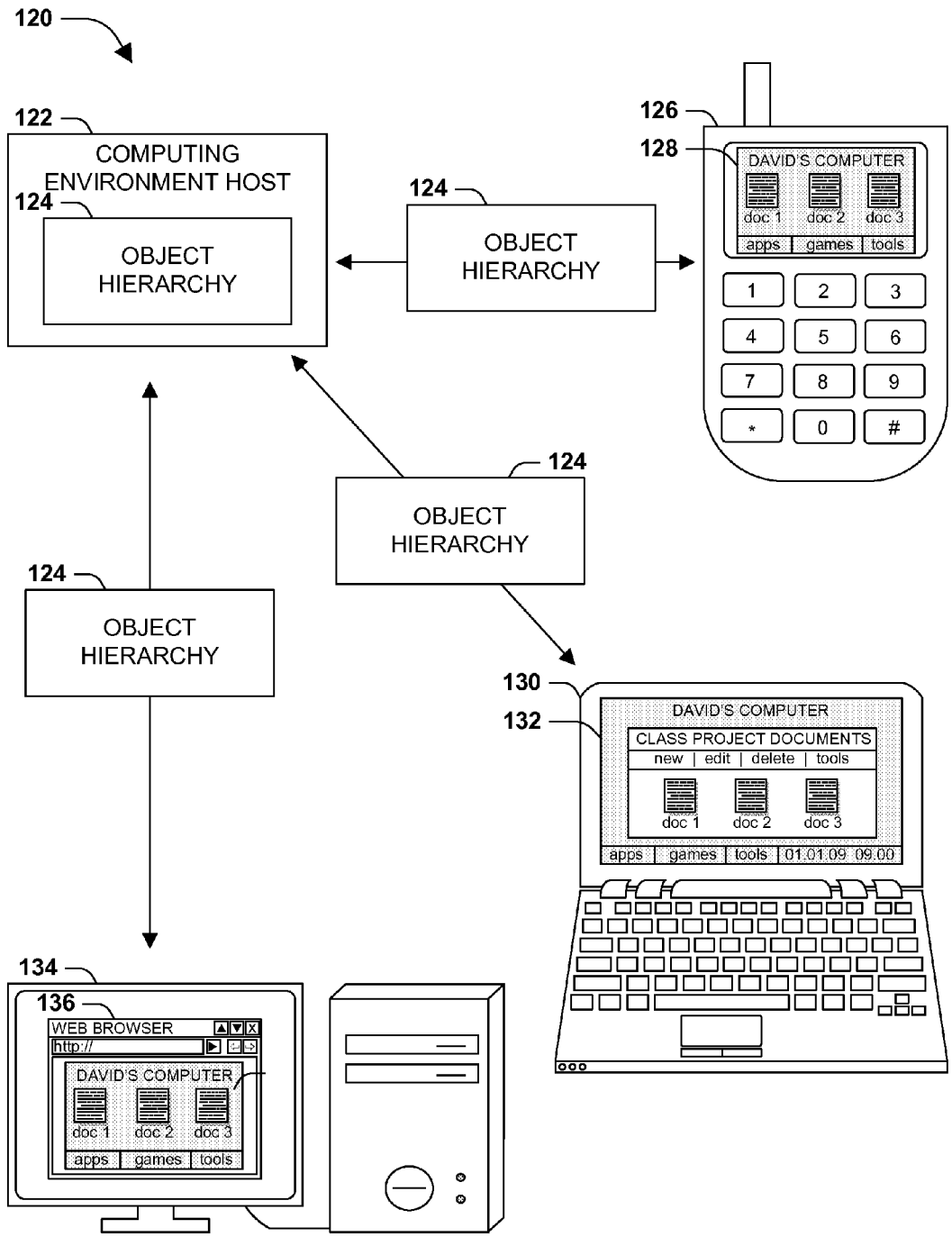
FIG. 7 is an illustration of an exemplary deployable computing environment within which the techniques discussed herein may be utilized.

FIG. 7 illustrates one such scenario 120, wherein the computing environment may be hosted by a computing environment host 122, which may store and manage an object hierarchy 124. The computing environment host 122 may also render the object hierarchy 124 in different ways on behalf of various devices, such as a cellphone device 126, a personal notebook computer 130, and a public workstation 134, and also on behalf of different types of users having different access privileges. Updates to the computing environment may be propagated back to the computing environment host 122, and may be automatically synchronized with other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment.

With respect to this exemplary scenario, the techniques discussed herein may utilize the deployable computing environment in many ways. As a first example, the receipt of data items 18, evaluation of data items 18 for association with topics 20, and/or generation of topical data feeds 48 may be distributed across the set of devices represented in the object hierarchy 124, which may be coordinated by the computing environment host 122. As a second example, the topical data feeds 48 may be presented to the user 12 in a more consistent manner through each of the devices. For example, if the user 12 first views a topical data feed 48 on the cellphone device 126, and later views the topical data feed 48 on the notebook computer 130, the presentation on the notebook computer 130 may exclude the data items 18 previously presented to the user 12 on the cellphone device 126. As a third example, in some embodiments, the topical data feed 48 may include one or more data objects represented in the object hierarchy 124, such as an email message relating to the topic 20 of a topical data feed 48. In the context of the exemplary scenario 120 of FIG. 7, a topical data feed 48 presented on a first device (such as the mobile phone 126) may include at least one data object represented in the object hierarchy 124 and stored on another device (such as the notebook computer 130), and/or by the computing environment host 122.

As a fourth example of this second aspect, a particular scenario relating to the architecture of embodiments of these techniques involves the interaction of an embodiment with a variety of data sources 14 to identify and extract the data items 18 of a data feed 16. While some data sources 14 may support or even promote the receipt and processing of data items 18 and the potential redistribution of data items 18 to a potentially large set of users 12, other data sources 14 may not actively support such processing. As a first example, a data source 14 may present a data feed 16 to the computer 62 in a manner that is not designed for automated parsing, but for presentation to a user 12, e.g., as a web page featuring embedded data items 18. The manner of embedding the data items 18 may be difficult to parse; for example, it may be difficult to map the elements of an HTML document to a set of data items 18; indeed, some data sources 14 may actively obfuscate the elements of the HTML document in order to reduce automated extraction of data items 18. As a second example, the data source 14 may present the data items 18 in a manner conducive to automated parsing, but useful metadata about the data item 18 (e.g., that may be helpful in identifying the topics 20 associated with the data item 18, and/or that may be presented to the user 12 with the data item 18 within the data feed 16) may be more difficult to identify, or may be identifiable in a manner particular to the data source 14 and/or data feed 16. For example, a data source 14 may include with the data item 18 an indication of an associated topic 20, but may do so in a manner particular to the data source 14 and/or data feed 16, such as hashtag notation.

In view of these details, some embodiments may be architecturally configured to facilitate the receiving of data items 18 from a variety of data sources 14. For example, an embodiment may utilize various heuristics to identify data items 18 (e.g., by identifying patterns in the HTML elements that may be indicative of a list of items), and/or to extract data-source-specific metadata regarding each data item 18 (e.g., by identifying common formatting of information, such as phone numbers and addresses, and associating extracted metadata with data items 18 associated therewith). Alternatively or additionally, an embodiment may be configured to apply specific processing logic to respective data items 18 of particular data feed 16 received from particular data sources 14. As a first example, an embodiment may include data-source-specific logic that utilizes a particular parsing protocol to extract data items 18 from a particular data source 14. For example, an embodiment may "web scrape" data items 18 out of a web server data source 14 based on predictable patterns in the HTML rendered by the webserver. As a second example, an embodiment may endeavor to identify a data source type of a data source 14, and may apply data-source-type-specific logic in order to extract data items 18 and/or metadata. For example, the embodiment may identify that a particular data source 14 is of a specific data source type, such as a web forum powered by a particular type of web forum software, and may therefore "web scrape" the web pages rendered by the data source 14 based on predictable patterns of HTML elements rendered by many data sources 14 of this data source type. As a third example, an embodiment may utilize data-feed-specific logic to extract data items 18 and/or metadata from a particular data feed 16, and/or data-feed-type-specific logic to extract data items 18 from any data feed 16 of a particular data feed type (e.g., it may be recognized that data feeds 16 comprising a photo stream may routinely encode the name of an author and the creation date of an image near the data item 18 representing an image, and so all data feed 16 identified as photo streams may be subjected to logic that endeavors to identify and extract author names and creation dates as relevant metadata of respective data items 18). As a fourth example, an embodiment may utilize data-item-type-specific logic to identify data items 18 (e.g., if a data feed 16 comprises images, logic may be utilized to examine the data objects of the data feed 16 and to extract as data items 18 any data objects matching the file format of an image), and/or to extract relevant metadata (e.g., the file format of an image may include metadata for the author name, and when an embodiment identifies a particular data item 18 as an image, it may endeavor to extract the author name based on the file format).

Figure 8:
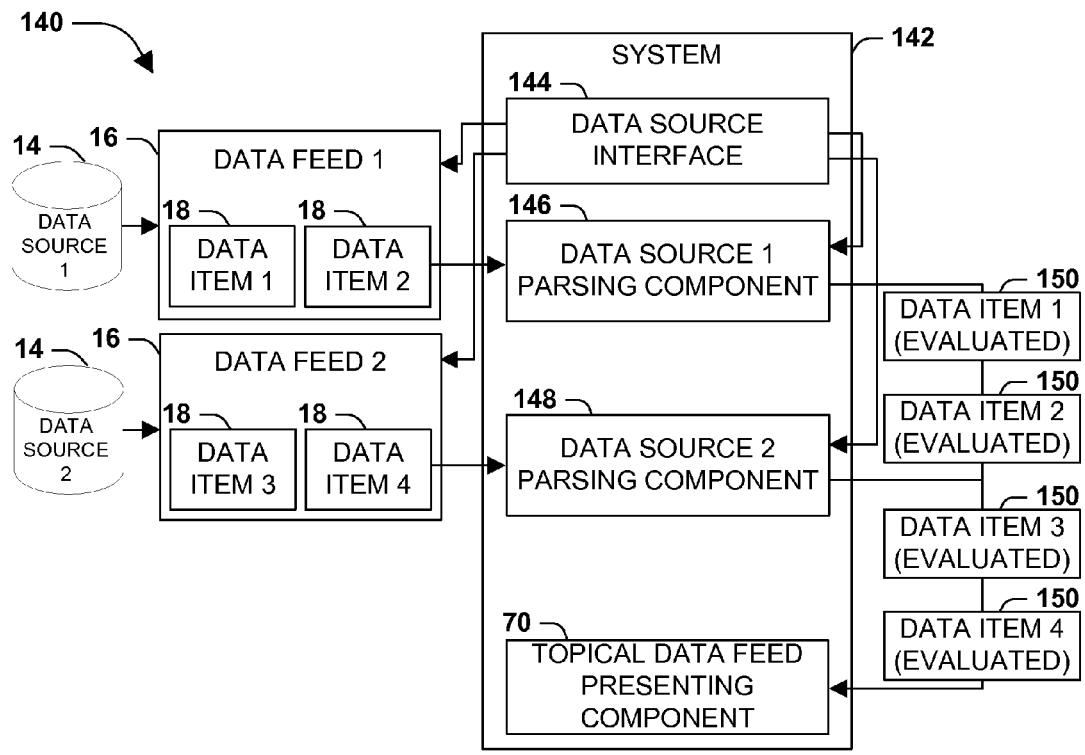
FIG. 8 is an illustration of an exemplary scenario featuring an embodiment featuring an architecture including per-data-source parsing components.

FIG. 8 illustrates an exemplary scenario 140 wherein an embodiment (illustrated as an exemplary system 142) implementing this type of architecture may evaluate data items 18 received from various data sources 14 based on a per-data-source-type basis. The exemplary system 142 includes a set of data source parsing components that are respectively configured to, for a particular data source type, parse data items 18 of data feeds 16 of data sources 14 of the data source type. For example, a first data source parsing component 146 may be configured to parse data items 18 provided by data sources of a first data source type, including a first data source 14 providing a first data feed 16; and a second data source parsing component 148 may be configured to parse data items 18 provided by data sources of a second data source type, including a second data source 14 providing a second data feed 16. The exemplary system 142 may also include a data source interface 144, which may be configured to, for respective data sources 14, identify the data source type of the data source 14 and invoke the data source parsing component for the data source type of the data source 14 in order to parse the data items 18 of the data source 14.

Based on this architecture, the exemplary system 142 illustrated in FIG. 8 may receive data items 18 from a variety of data sources 14 in the following manner. In order to receive data items 18 from the first data source 14, the exemplary system 142 may invoke the data source interface 144 to identify the data source type of the first data source 14. This data source type may be supported by the first data source parsing component 146, which the data source interface 144 may invoke to receive data items 18 from the first data source 14 and to parse them in accordance with the formatting of the data source type of the first data source 14. The first data source parsing component 146 may therefore receive the first data item 18 and the second data item 18 of the first data feed 16 offered by the first data source 14, may evaluate them in accordance with the formatting of the data source type of the first data source 14, and may generate a set of evaluated data items 150. Similarly, in order to receive data items 18 from the second data source 14, the exemplary system 142 may invoke the data source interface 144 to identify the data source type of the second data source 14, which may in turn invoke a second data source parsing component 148 to receive the data items 18 of the second data feed 14 offered by the second data source 14, and to parse the data items 18 in accordance with the formatting of the data source type of the second data source 14 in order to produce evaluated data items 150. The evaluated data items 150 may then be provided to a topical data feed presenting component 72 of the exemplary system 142, which may generate topical data feed 48 therefrom. This exemplary system 142 may be implemented, e.g., with a pluggable or driver-based architecture, such that when new data source types are discovered or when data source types change, a data source parsing component may be added or altered to receive data items 19 from data sources 14 of the new or altered data source type. Those of ordinary skill in the art may devise many scenarios wherein the techniques discussed herein may be utilized.

A third aspect that may vary among embodiments of these techniques relates to the manner of receiving data items 18 of data feeds 16 from the corresponding data sources 14. As a first example of this third aspect, these techniques may be performed on a computer 62 that has access to a data feed 16, such as a webserver that serves the data feed 16 or a computer 62 that may access a database containing the data items 18 of the data feed 16. As a second example of this third aspect, the computer 62 may request the data feed 16 over a network, such as a local area network, a cellular network, or the internet. An embodiment of these techniques (such as the data item receiving component 68) may therefore monitor the data feed 16, e.g., by polling the data source 14 on a periodic basis or upon request of the user 12. Alternatively or additionally, the embodiment may be able to request the data source 14 to notify the embodiment upon receiving one or more data items 18, such as by subscribing to the data source 14 to receive data items 18 of a data feed 16. The data source 14 might therefore actively notify the embodiment upon receiving one or more new data items 18, and/or may periodically generate and send to the embodiment a digest of newly received data items 18.

As a third example of this third aspect, some data sources 14 may not simply fail to support the automated extraction of data items 18 from one or more data feeds 16 or deter automated extraction (e.g., through the use of captchas or obfuscation of HTML structure), but may actively prohibit automated processing, such as by specifying the prohibition in an acceptable use policy of a website featuring the data feed 16.

This policy may be based on various interests of the administrator(s) of the data source 14 and/or feed 16, e.g., restricting website access to human visits in order to promote advertising revenue, or reducing bandwidth- and processing-intensive automated accessing that may be inefficient. Therefore, it may be impermissible for a single user 12 or a group of users 12 to receive data items 18 in an automated manner, and the administrator(s) of the data source 12 may endeavor to detect and blacklist or otherwise block access to the data feed 16 by violators. However, some embodiments of the techniques presented herein may be particularly advantageous when used to service a large set of users 12, e.g., by receiving and evaluating each data item 18 once on behalf of a large body of users. This scalability may also promote the interests of the administrator(s) of a data source 12; e.g., these techniques may enable the data feed 16 to reach a much larger body of users 12 without incurring additional bandwidth costs to the data source 14. Because these techniques may offer scalability advantages, it may be in the interests of the administrator(s) of various data sources 14 to permit the automated monitoring of the data feed(s) 16 by the embodiment, thereby promoting the receipt of data items 18 by the embodiment. Those of ordinary skill in the art may devise many ways of receiving data items 18 while implementing the techniques discussed herein.

A fourth aspect that may vary among embodiments of these techniques relates to the manner of identifying the topics 20 with which a data item 18 may be associated (such as may be performed by the topic identifying component 70 in the exemplary system 66 of FIG. 4). It may be appreciated that a wide variety of data feeds 16 offered by a wide variety of data sources 14 may present a wide variety of data items 18, such as text written in many different domains (e.g., news articles, technical presentations, statistical and factual summaries, anecdotes and dialogue retrieved from weblogs and social networking sites, images and video recordings, and various types of data objects). Moreover, such data items 18 may be authored in various languages, styles (e.g., technical, academic, or colloquial), and contexts. The automated identification of topics 20 associated with such a wide variety of data items 18 may be difficult, and while human participation may be involved in identifying some such topics 20 (incorporating a "Mechanical Turk" technique), the costs of receiving accurate human attention to a large volume of data items 18 may not be feasible.

Therefore, in order to identify topics 20 associated with respective data items 18, embodiments of these techniques may feature various forms of automated analysis, including a large and sophisticated set of automated techniques. Some such techniques may involve examining the metadata of a data item 18 to identify associated topics 20. As a first example of this fourth aspect, various types of metadata associated with a data item 18 may be compared with topical metadata items that are often associated with various topics 20 in order to identify the topics 20 associated with the data item 18. For example, a photographic image captured at a geocoded location may be compared with the known geocodes of various landmarks in order to identify a likely subject of the photograph. As a second example of this fourth aspect, a topic 20 have a particular topical identifier, such as a distinctive identifier of an individual (e.g., a numeric identifier of the profile of an individual represented in a social network, or a URI associated with a resource describing a particular event), and a data item 18 may include a topical identifier of a topic 20 as an indication of an association of the data item 18 with the topic 20. Moreover, some of these topical identifiers may be specific to a particular data source 14, data feed 16, and/or type of data item 18; e.g., a particular website may adopt an indicative convention, such as a particularly formatted hashtag, to indicate topics 20 associated with data items 18. The architectural variations discussed herein, such as illustrated in the exemplary scenario 140 of FIG. 8, may therefore detect these conventions for use in identifying the topics 20 associated with a data item 18.

Other variations of this fourth aspect may utilize content-based forms of analysis. As a third example of this fourth aspect, various heuristics may be utilized to identify topics 20 in a data item 18, such as the detection of keywords using a glossary of known topics 20, or of proper nouns that might correspond to the topics 20 of the data item 18. As a fourth example of this fourth aspect, semantic analysis may be utilized. For example, for data items 18 comprising an expression (such as a document or comment authored by a user 12), a natural-language parser may be applied to parse the expression and to identify one or more topics 20 that, based on concepts such as linguistic structure, are referenced by the expression; and image analysis techniques and biometrics may be utilized to identify particular objects and individuals present in a photographic image. As a fifth example of this fourth aspect, various forms of contextual analysis may be utilized; e.g., all data items 18 retrieved from a particular data feed 16 or data source 14 may be presumed to relate to a particular topic 20; or, when a topic 20 is identified as associated with a first data item 18, a second data item 18 related to the first data item 18 may be presumably associated with the same topic 20. As a sixth example of this fourth aspect, contextual relationships among data items 18 may be used to identify that a topic 20 associated with a first data item 18 is also associated with a contextually related second data item 18. For example, a dialogue between two individuals may be represented as a set of related data items 18 comprising comments that are responsive to one another. A topic 20 that is referenced within a data item 18 may therefore be identified as contextually relating to responsive comments represented by other data items 18. This relationship may be explicitly followed, e.g., by repeated mention of the topic, or may be inferred, e.g., by presuming a contextual relationship of subsequent comments to the topic 20 (e.g., the comments that follow the topic-referencing comment within a certain period of time). More sophisticated embodiments may include several of these techniques, and may combine such analyses using various forms of artificial intelligence techniques, such as fuzzy logic, Bayesian analysis, expert systems, and artificial neural networks.

Figure 9:
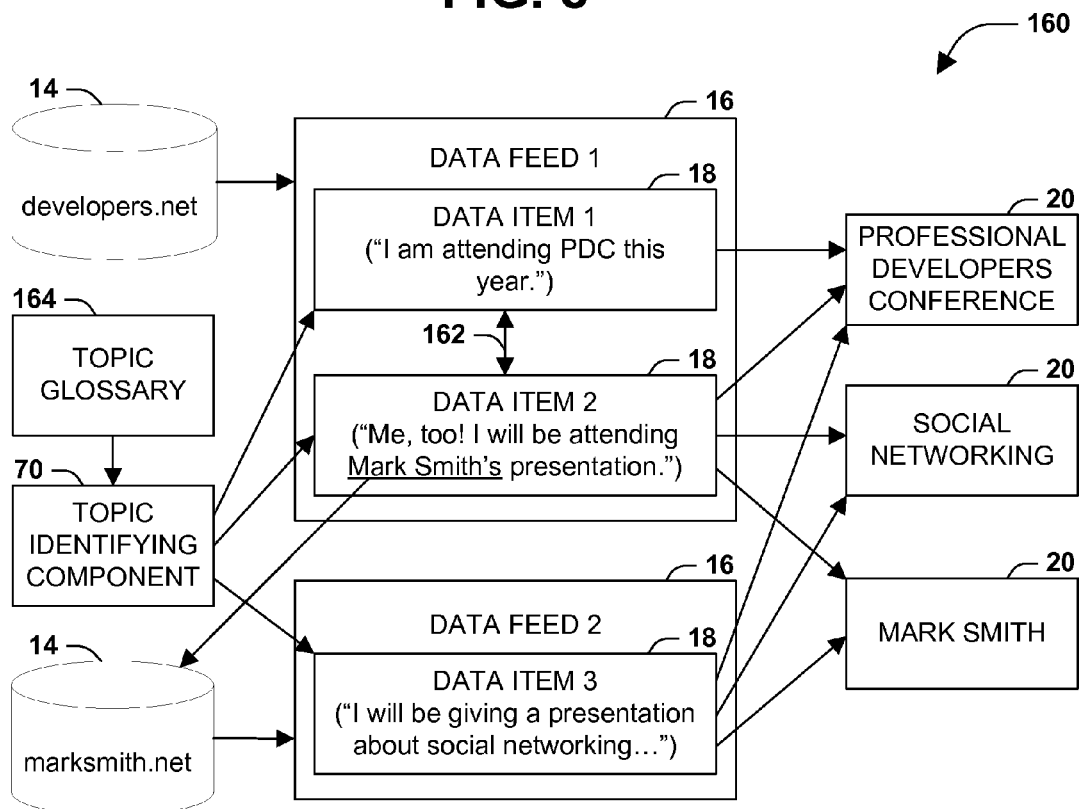
FIG. 9 is an illustration of an exemplary scenario featuring a technique for identifying topics associated with a set of data items.

FIG. 9 presents an exemplary scenario 160 featuring an automated identification of topics by a topic identifying component 70 that utilizes several of these techniques. In this exemplary scenario 160, a first data source 14 provides a first data feed 16 (such as a web forum) comprising a dialogue between two users, represented as a set of two data items 18 having a relationship 162, and a second data source 14 (a webserver of an individual named Mark Smith) provides a second data feed 16 (such as a weblog of the individual) comprising a third data item 18 that represents a comment authored by the individual. A topic identifying component 70 may be applied to identify a set of topics 20 that may be associated with these data items 18, and may utilize various techniques in this identification. First, the topic identifying component 70 may access the first data item 18 and may identify the acronym "PDC" used in the comment. The topic identifying component 70 may endeavor to identify this topic with more particularity by referring to a topic glossary 164, which may include a mapping of the acronym "PDC" to the event known as the Professional Developers Conference;

accordingly, the topic identifying component 70 may associate the first data item 18 with the topic 20 for this event. The topic identifying component 70 may then examine the second data item 18, and by identifying the relationship 162 between the first data item 18 and the second data item 18 (the second represented as a responsive comment to the first) and the semantic relationship therebetween (where the "Me, Too!" comment in the second data item 18 refers to the event referred to by the first data item 18), may associate the second data item 18 with the same topic 20 associated with the first data item 18. The topic identifying component 70 may also identify a URL embedded in the second data item 18 referencing the second data source 18, which is managed by a known individual known as a particular topic 20 (e.g., a frequently referenced individual). Based on this topical identifier, the topic identifying component 70 may therefore associate the second data item 18 with the topic 20 associated with this individual.

Turning to the third data item 18 represented in the exemplary scenario 160 of FIG. 9, the topic identifying component 70 may first evaluate the domain of the third data item 18 as a topical identifier, may associate the third data item 18 with the topic 20 of the same individual referenced in the second data item 18. The topic identifying component 70 may also identify a "social networking" keyword in the content of the third data item 18, and may associate the third data item 18 with the topic 20 representing social networking. The topic identifying component may also match the semantic content of the third data item 18 with that of the first and second data items 18, and may identify that the referenced presentation about social networking is to be given at the Professional Developers conference. Therefore, the topic identifying component 70 may associate the third data item 18 with the Professional Developers Conference topic 20 where the presentation is to be given, and may associate the second data item 18 with the "social networking" topic 20 on which the referenced presentation may be given. In this manner, the topic identifying component 70 may use many techniques, involving both the metadata of each data item 18 (including relationships 162 thereamong) and the content of each data item 18, in order to associate the data items 18 with topics 20. Those of ordinary skill in the art may devise many ways of associating data items 18 with topics 20 while implementing the techniques discussed herein.

A fifth aspect that may vary among embodiments of these techniques relates to the manner of receiving topics 20 from the user 12. As a first example of this fifth embodiment, the user 12 may simply specify a set of topics 20 that are of interest to the user 12, such as by providing a set of keywords or selecting from a list of available topics 20 for which an embodiment of these techniques is configured to provide topical data feeds 48. Alternatively or additionally, one or more topics 20 may be inferred based on information about the user 12. As a second example of this fifth aspect, communication of the user 12 may be monitored to identify topics 20 that the user 12 is likely to discuss, such as by identifying keywords written by the user 12 corresponding to various topics 20. As a third example of this fifth aspect, at least one user descriptor of the user 12 may be identified, such as information about the user 12 stored in a user profile (e.g., the age, geographic location, profession, or described interests of the user 12), and based on the user descriptor, at least one topic 20 may be inferred as of potential interest to the user 12. As a fourth example of this fifth aspect, various user actions of the user 12 may be monitored, and at least one topic 20 of potential interest to the user 12 may be inferred. For example, an embodiment of these techniques may monitor the websites visited by the user 12, may identify various topics 20 associated with such websites, and may gauge the interest of the user 12 in such topics 20 according to the degree of interaction of the user 12 with the website (such as the amount of time spent browsing the website, the frequency of return visits to the website, and the effort expended by the user 12 to interact with the website, such as passive browsing of a web forum for a particular topic 20 as compared with active participation in the web forum).

A sixth aspect that may vary among embodiments of these techniques relates to the manner of generating a topical data feed 48 based on the data items 18 associated with a topic 20. As a first example of this sixth aspect, an embodiment may select the data items 18 associated with a particular topic 20 and aggregate the data items 18 into a topical data feed 48 of the topic 20. The aggregation may be performed many ways, e.g., by presenting the data items 18 as an unordered set, or ordered in various ways (e.g., chronologically, by a measure of significance such as the degree of relationship with the topic 20, by a measure of priority such as the degree of trustworthiness or authoritativeness of the data source 14 of each data item 18, or a combination of such factors). As a second example of this sixth aspect, the data items 18 may be integrated into a topical data feed 48 in many ways, e.g., by including the full contents of each data item 18; by including a summary or excerpt of each data item 18, such as the first few words or sentences of a textual data item 18 or a thumbnail version of an image data item 18; by including a description of each data item 18, such as a filename, object type, size, and source; or by including a reference to the data item 18, such as a URI whereby the data item 18 may be accessed.

Some variations of this sixth aspect involve various filters that may be specified by a user 12 for application to the data items 18 while generating the topical data feed 48. The user 12 may specify various criteria for adjusting the aggregation of the data items 18 associated with the topic 20 into a topical data feed 48. These filters may specify various criteria, such as keywords that may be present in the data items 18; values or value ranges of various metadata items associated with the data items 18, such a date range of the publication date of the data item 18; or a group of trusted or untrusted identities, including the identities of data sources 14 or individuals who may serve as the authors or subjects of various data items 18. Moreover, for data items 18 matching the criteria of a filter, the filter may specify that data items 18 may be included in or excluded from the topical data feed 48; may be represented in the topical data feed 48 in different ways (e.g., the topical data feed 48 might comprise full versions of more interesting data items 18 an excerpts or descriptions of less interesting data items 18); may be emphasized or de-emphasized in the topical data feed 48, such as by increasing or decreasing the size of a thumbnail representation of a data item 18 to reflect priority or significance; may be positioned within the topical data feed 48 in a particular manner, such as before or after other data items 18; etc. Additionally, a set of such filters may be combined in many ways, e.g., using a hierarchy of Boolean logic or fuzzy logic, as a Bayesian network or expert system, or as a scoring or weighting system to identify a desired threshold value above which a data item 18 may be interesting to the user 12 or a desired ordering among the data items 18 in the topical data feed 48. In one such embodiment, a criterion of a filter may specify a score that is attributable to data items 28 matching the criterion; and when the topical data feed 48 is generated, an aggregate score may be computed for respective data items 18 according to the criteria of the filter, and the data items 18 of the topical data feed 48 may be ordered according to the aggregate scores. Many types of criteria may be devised, and many types of filters with various effects and interrelationships may apply such criteria to the data items 18 while generating a topical data feed 48.

Additional variations of this sixth aspect involve various types of services may be applied while generating the topical data feed 48 from the data items 18 associated with the topic 20. As a third example of this sixth aspect, an embodiment may endeavor to reduce the inclusion of redundant data items 18 in one or more topical data feeds 48. In one such scenario, two data items 18 associated with the same topic 20 may be identified as equivalent, such as two news articles describing the same event or featuring substantially similar content, and one such data item 18 may be removed from the topical data feed 48. In another such scenario, a data item 18 included in a first topical data feed 48 may be identified as having been included in a second topical data feed 48, or as having been included in an earlier presentation of the first topical data feed 48, and may therefore be removed from the first topical data feed 48 to reduce the redundant presentation of the same data item 18 to the user on more than one occasion. As a fourth example of this sixth aspect, data items 18 may be transformed and/or supplemented for inclusion in the topical data feed 48. For example, references to the topic 20 within the content of the data item 18 may be emphasized; the data item 18 may be translated from an original language into a native language; or the data items 18 may be converted from various representations to a standardized representation that is more consistent among the data items 18 of the topical data feed 48 (e.g., a set of data items 18 comprising images may be received in a variety of image formats, such as GIF, JPG, and PNG, and may be converted to a standardized image format, such as TIFF, for inclusion in the topical data feed 48). As a fifth example of this sixth aspect, the data items 18 may be further categorized; for example, a particular topic 20 (such as an actor) may be divided into subtopics (such as roles undertaken by the actor in different performances or works), and the data items 18 may be subcategorized within the topical data feed 48 by subtopic or cross-referenced with related topics 20. Many types of services may be devised and applied to the data items 18 of the topical data feed 48.

Figure 10:
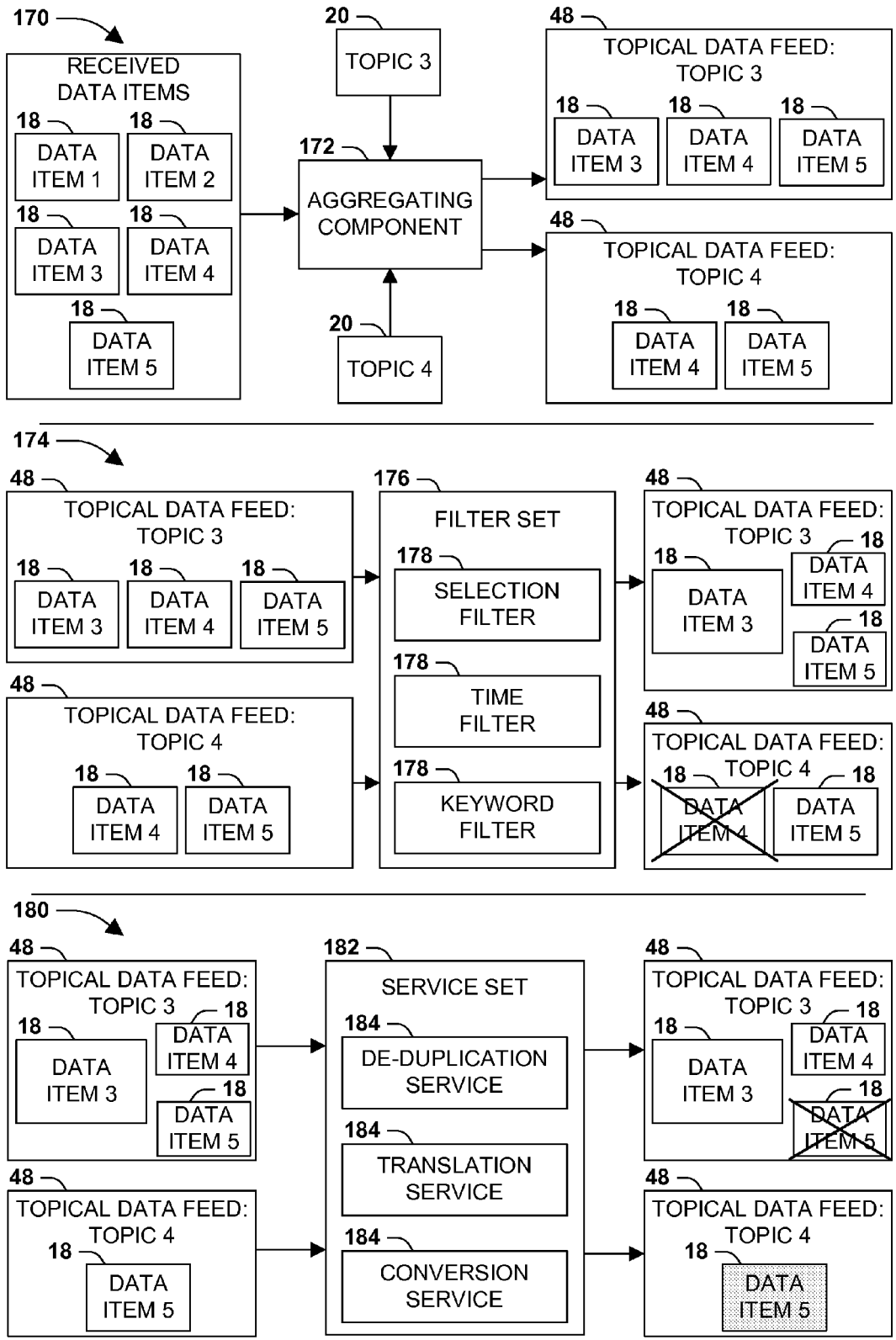
FIG. 10 is an illustration of an exemplary scenario featuring the generation of topical data feed from a set of data items associated with various topics.

FIG. 10 presents an exemplary illustration featuring the generation of a set of topical data feeds 48 from a set of data items 18 that have been previously received and associated with various topics 20. At a first time point 170 in this exemplary scenario, the received data items 18 may be processed by an aggregating component 172 that may generate a third topical data feed 48 comprising the data items 18 associated with the third topic 20 and a fourth topical data feed 48 comprising the data items 18 associated with the fourth topic 20. While these topical data feeds 48 might be presented to a user 12, additional value may be added to the topical data feeds 48 through the application of a set of filters and services. Therefore, at a second time point 174 in this exemplary scenario, a filter set 176 may be applied to the topical data feeds 48 to adjust the set of data items 18 comprising each data feed 48 according to the criteria and effects of various filters 178, such as by removing, reordering, emphasizing, or de-emphasizing the data items 18 according to various criteria specified by the user 12. For example, a selection filter may be applied to select particular data items 18 of more interest than other data items 18; e.g., in the third topical data feed 48, the third data item 18 may be identified as of higher priority or potential interest to the user 12 and may be expanded for emphasis, while the fourth data item 18 and the fifth data item 18 may be identified as of lower priority and may be reduced for de-emphasis. A time filter and keyword filter may also be applied to the topical data feeds 48 to remove data items 18 that are stale or of less interest to the user 12; e.g., in the fourth data feed 48, the fourth data item 18 may be removed if it includes keywords that are divergent from the fourth topic 20 (e.g., the fourth topic 20 may involve "web development," in order to reduce the inclusion of unrelated entomological articles involving the development of spider webs, a keyword filter for "arachnid" may be applied to the topical data feed 48.) At a third time point 180 in this exemplary scenario, a service set 182 may be applied to the topical data feeds 48 to adjust further the data items 18 according to various services 184. For example, a de-duplication service may be applied to reduce the redundant presentation of duplicate data items 18; e.g., this service may identify that the fifth data item 18 is included in both the third topical data feed 48 and the fourth topical data feed 48, and may therefore remove it from the third topical data feed 48. A conversion service might also be applied to convert data items 18 into a more consistent or more compatible format; e.g., the fifth data item 18 may be converted to a new representation for inclusion in the fourth topical data feed 48. By applying these filters 178 and services 184 to the data items 18 of the topical data feeds 48, the embodiment of these techniques presented in the exemplary scenario of FIG. 10 thereby generates an improved set of topical data feeds 48 that may be of more interest to the user 12.

Additional variations of this sixth aspect relate to the supplementing of a topical data feed 48 with user-specific data items. Many types of user-specific data items may be identified, associated with topics 20, and included in topical data feeds 48. As a sixth example of this sixth aspect, a user-specific data item may comprise an access-controlled data item, which is accessible only to a particular set of individuals including the user 12 (and, perhaps, that is accessible only to the user 12). For example, the user-specific data items may include files, email messages, or database records that are personal to the user 12, or a set of articles in a subscription-based service to which access is limited to a particular set of subscribers. As a seventh example of this sixth aspect, the access-controlled data items may include data objects represented in an object hierarchy 124, such as in the exemplary scenario 120 of FIG. 7, and may be stored on another device accessible through the mesh or on the computing environment host 122. In these examples, an embodiment of these techniques may examine various data objects that are accessible to the user 12, and may identify topics 20 with which such data objects are associated; and while generating a topical data feed 48 for the topic 20, the embodiment may include one or more of these data objects as user-specific data items associated with the topic 20. For example, the embodiment may obtain the user-specific data items on behalf of the user 12 by utilize the credentials of the user 12 (such as logging into an access-controlled subscription service using credentials of the user 12); or the embodiment, operating on a first device, may contact a second device or a computing environment host 122 of a deployable computing environment in order to obtain topically relevant data objects that are represented in the object hierarchy 124.

Figure 11:
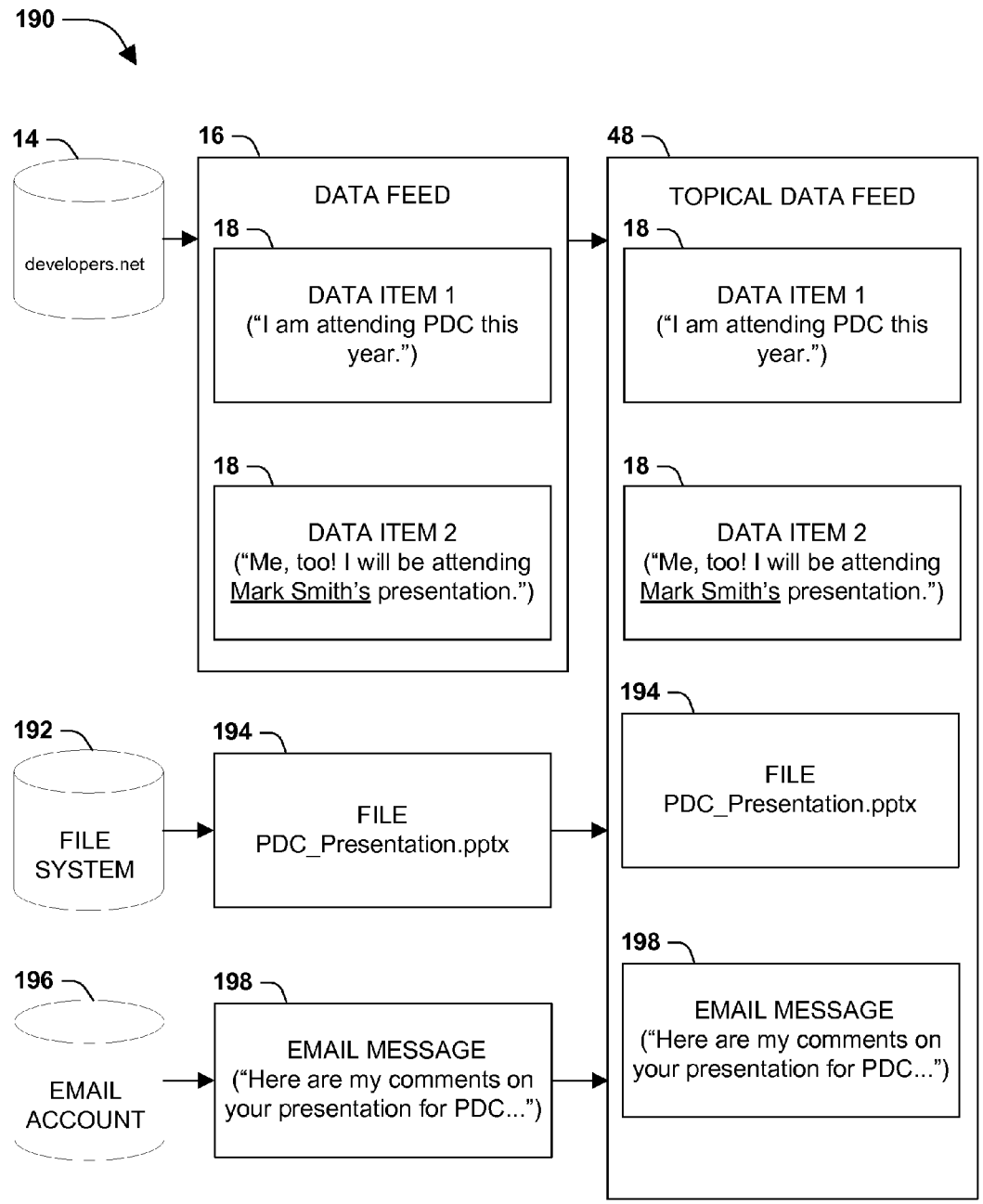
FIG. 11 is an illustration of an exemplary scenario featuring an aggregation of a topical data feed comprising a set of data items and some user-specific data items.

FIG. 11 presents an exemplary scenario 190 featuring the inclusion of user-specific data items while generating a topical data feed 48. An embodiment of these techniques may receive a set of data items 18 of a data feed 16 from a data source 14, such as a website featuring a web forum comprising a set of web posts. The data items 18 may be evaluated for association with a particular topic 20 (such as the Professional Developers Conference), and a topical data feed 48 may be generated from the data items 18 associated with the topic 20. In addition, the user 12 may have access to particular user-specific data items, such as a set of files in a file system 192 and a set of email messages in an email account 196. From the file system 192, a file 194 may be identified as associated with the topic 20, and from the email account 196, an email message 198 may be identified as associated with the topic 20. Therefore, the file 194 and the email message 198 may be included in the topical data feed 48 along with the data items 18 retrieved from the data source 14, in order to present to the user 12 a customized and comprehensive set of data items relating to the same topic 20. Those of ordinary skill in the art may devise many ways of generating topical data feeds while implementing the techniques discussed herein.

A seventh aspect that may vary among embodiments of these techniques relates to the manner of presenting the topical data feeds 48 to the user 12. As a first example of this seventh aspect, the presenting 100 may involve rendering on a display the data items 18 comprising one or more topical data feeds 48, or may involve delivering the topical data feeds 48 to a device operated by the user 12. As a second example of this seventh aspect, the presenting 100 may be performed in response to many events. In a first such scenario, the user 12 may specify a set of topics 20 of interest, and an embodiment may promptly generate or retrieve the topical data feeds 48 associated with the specified topics 20 and may present the topical data feeds 48 to the user 12. In a second such scenario, upon receiving from the user 12 at least one topic 20, the topical data feed presenting component 72 may be configured to store the topics 20 in a data store that is configured to store data items 18 associated with various topics 20. Later, upon receiving from the user 12 a request to present topical data feeds 48 (based on the previously specified topics 20), the topical data feed presenting component 48 may retrieve these topics 20 from the data store, may generate the topical data feeds 48 for these topics 20, and may present the topical data feeds 48 to the user 12. Moreover, the inclusion of a data store for the data items 18 and/or topical data feeds 48 may permit archiving of such topical data feeds 48, and may permit users 12 to request archival topical data feeds 48 of older topics 48, such as a topical narrative of an event from several years prior. In a third such scenario, an embodiment may store the topics 20, and may periodically provide to the user 12 a series of refreshed set of topical data feeds 48 that include (or that are limited to) newly received data items 18 associated with the topic 20 that have been received since the previous presentation. In a fourth such scenario, after presenting 100 a first set of topical data feeds 48, an embodiment may, upon receiving a new data item 18 relating to the topic 20 of a topical data feed 48, send the new data item 18 to the user 12, such as by an email notification of the newly received data item 18, or by refreshing a currently presented topical data feed 48 to include the latest data items 18.

As a third example of this seventh aspect, computing resources may be allocated in various ways to generate the topical data feeds 48 on behalf of a (potentially large) set of users 12. In a first such scenario, the data items 18 may be received and associated with topics 20 on behalf of all users, but the generation of topical data feeds 48 may be performed on a per-user and per-request basis; e.g., when a user 12 specifies a topic 20 of interest, an embodiment may generate and present a topical data feed 48 based on the data items 18 associated therewith. In a second such scenario, a set of topical data feeds 48 may be generated for various topics 20, and when a user specifies or selects a topic 20, the topical data feed 48 for the topic 20 may be retrieved and presented to the user 12. For example, the embodiment may maintain a stock of topical data feeds 48 for popular topics 20 in order to avoid repeatedly generating the same topical data feed 48 for each user 12 and/or user request, thereby providing an efficiency gain (particularly if the topic 20 is frequently requested by many users, and/or if the generation of the topical data feed 48 is computationally intensive, such as involving sophisticated language translation of data items 18). However, this second scenario may not include some aspects of the personalization of the topical data feeds 48 for particular users 12, such as illustrated in the exemplary scenario 190 of FIG. 11. Therefore, some scenarios may involve the supplementation of previously generated topical data feeds 48 with user-specific data items in order to promote the personalization of topical data feeds 48 for respective users.

Figure 12:
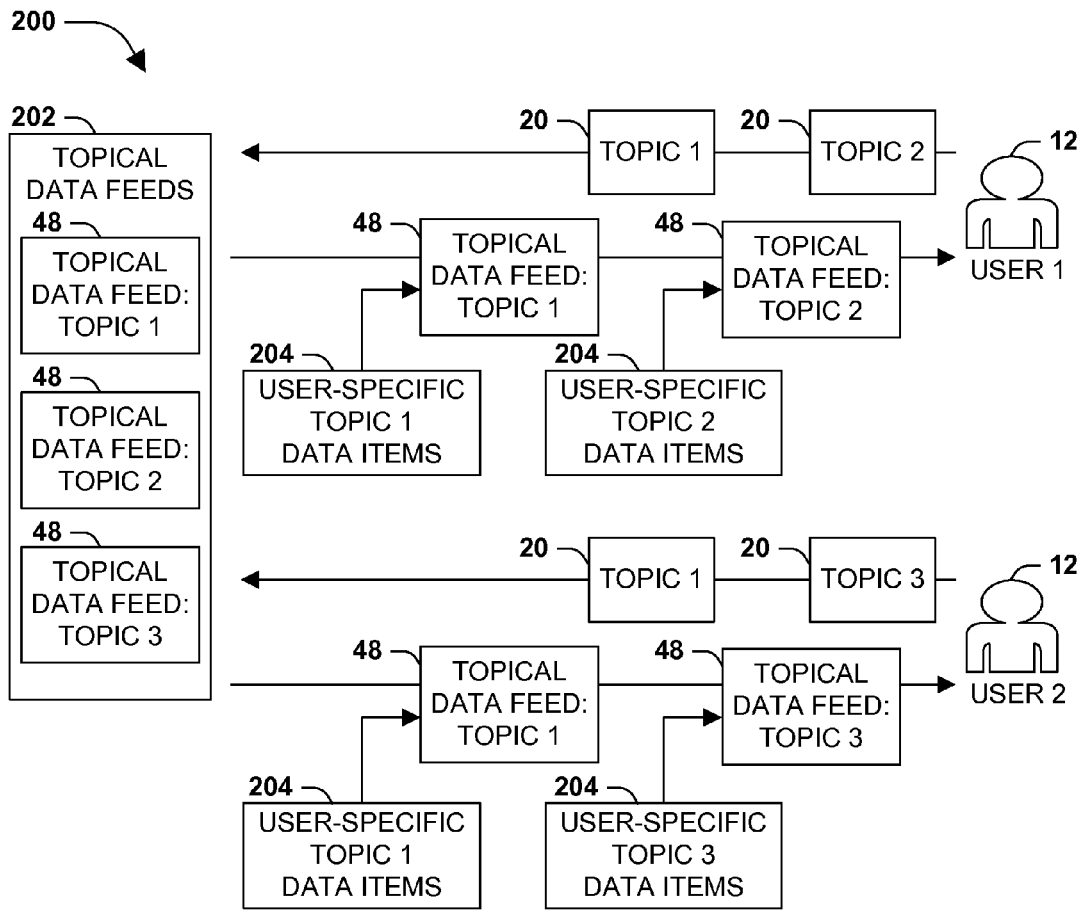
FIG. 12 is an illustration of an exemplary scenario featuring an efficient generation of topical data feeds supplemented with user-specific data items for per-user personalization of the topical data feeds.

FIG. 12 presents an exemplary scenario 200 featuring the personalization of a topical data feed set 202 on behalf of various users 12. An embodiment of these techniques may generate respective topical data feeds 48 for a set of three topics 20, which may be requested by various users 12. For example, the first user 12 may include within a set of topics of interest the first topic and the second topic, and the previously generated topical data feeds 48 for both topics 20 may be presented. However, as part of the presentation, an embodiment may identify, select, and include in the first topical data feed 48 any user-specific data items 204 relating to the first topic 20, and may identify, select, and include in the second topical data feed 48 any user-specific data items 204 relating to the second topic 20. Similarly, a second user 12 may specify as of interest the first topic 20 and the third topic 20, and an embodiment may retrieve each topical data feed 48, supplement each topical data feed 48 with user-specific data items 204 associated with the same topic 20, and deliver the supplemented topical data feeds 48 to the second user 12. Therefore, although the first topical data feed 48 is generated once from the (non-personalized) data items 18 associated with the first topic 20, the presentation of this topical data feed 48 may be personalized for respective users 12 with user-specific data items 204 also associated with the first topic 20, thereby achieving both improved efficiency and personalization.

As a fourth example of this seventh aspect, the rendering of a topical data feed 48 may be achieved in many ways. The data items 18 of the topical data feed 48 may be visually presented, e.g., as a list, as a collage, or as a set of nested nodes illustrating a hierarchy of topics 20 and subtopics. In a first such scenario, the data items 18 may be organized as a topical narrative that may be presented to the user; e.g., comments about an event may be sorted and presented in chronological order as a narrative report of the event. In a second such scenario, the data items 18 may be organized according to priority (e.g., "high-interest items," "medium-interest items," and "low-interest items"), topics (e.g., "topic 1" containing data items 18 organized into "subtopic 1" and "subtopic 2"), reliability (e.g., "items from authoritative sources" and "items from other sources"), or personalization (e.g., "personalized items and items from acquaintances" and "non-personalized items"). In a third such scenario, interrelationships among data items 18 may be visually included in the presentation. For example, a first data item 18 of a topical data feed 48 may have a responsive relationship with a second data item in the same topical data feed 48 or in another topical data feed 48, such as a reply to a comment, and a responsive indicator (such as an arrow or a hierarchical organization) may be included in the presentation of the data items 18 in the topical data feed 48. In a fourth such scenario, the topical data feeds 48 may be presented in a queryable format, such that a user 12 may search for data items 18 within the topical data feed 48 matching certain criteria.

Figure 13:
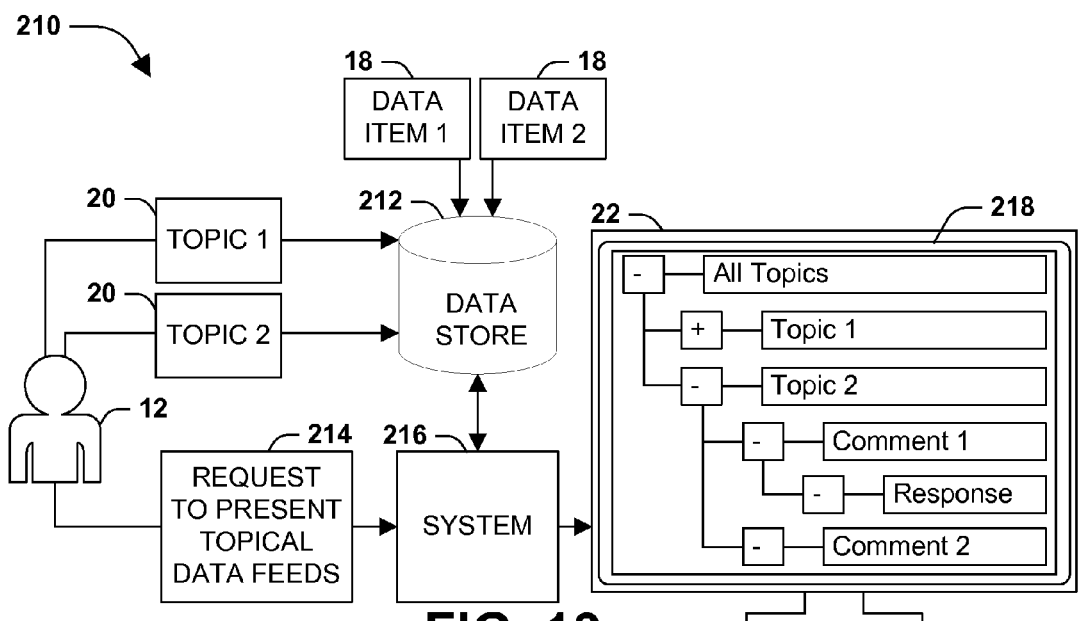
FIG. 13 is an illustration of an exemplary scenario featuring a presentation of a set of topical data feeds in a hierarchical tree view with a relatedness indicator between two data items.

FIG. 13 presents an exemplary scenario 210 featuring a presentation 218 of data items 18 comprising topical data feeds 48 for various topics 20. An embodiment of these techniques (such as a system 216) may have access to a data store 212, such as a file system or database, and may store data items 18 in the data store 212 with associations to various topics 20. A user 12 may specify two topics 20 of particular interest, and the system 216 may store these two topics 20 in the data store 212 with an association to the user 12. Later, the user 12 may submit to the system 216 a request 214 to present a set of topical data feeds 48. The system 216 may fulfill this request 214 by retrieving the two topics 20 previously specified by the user 12 from the data store 212, retrieving the data items 18 associated with respective topics 20, generating two topical data feeds therefrom (possibly involving the application of various filters and/or services, such as in the exemplary scenario of FIG. 10), and rendering on a display 22 a presentation 218 of the topical data feeds 48. In this exemplary scenario 210, the topical data feeds 48 are presented as a tree view, with respective topics 20 presented as a first set of nodes comprising subnodes as data items 18 associated with each topic 20. Moreover, where two data items 18 have a responsive relationship (such as a reply to a comment), this relationship may be presented as a responsive indicator, such as the presentation of the responsive data item 18 as a nested subnode of the data item 18 as the target of the response. In this manner, the system 216 may fulfill a request of the user 12 to present topical data feeds 48 by rendering or the user 12 a representation of the data items 18 of various topics 20, with visual indicators of relatedness. Those of ordinary skill in the art may devise many ways of presenting the topical data feeds 48 to a user 12 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
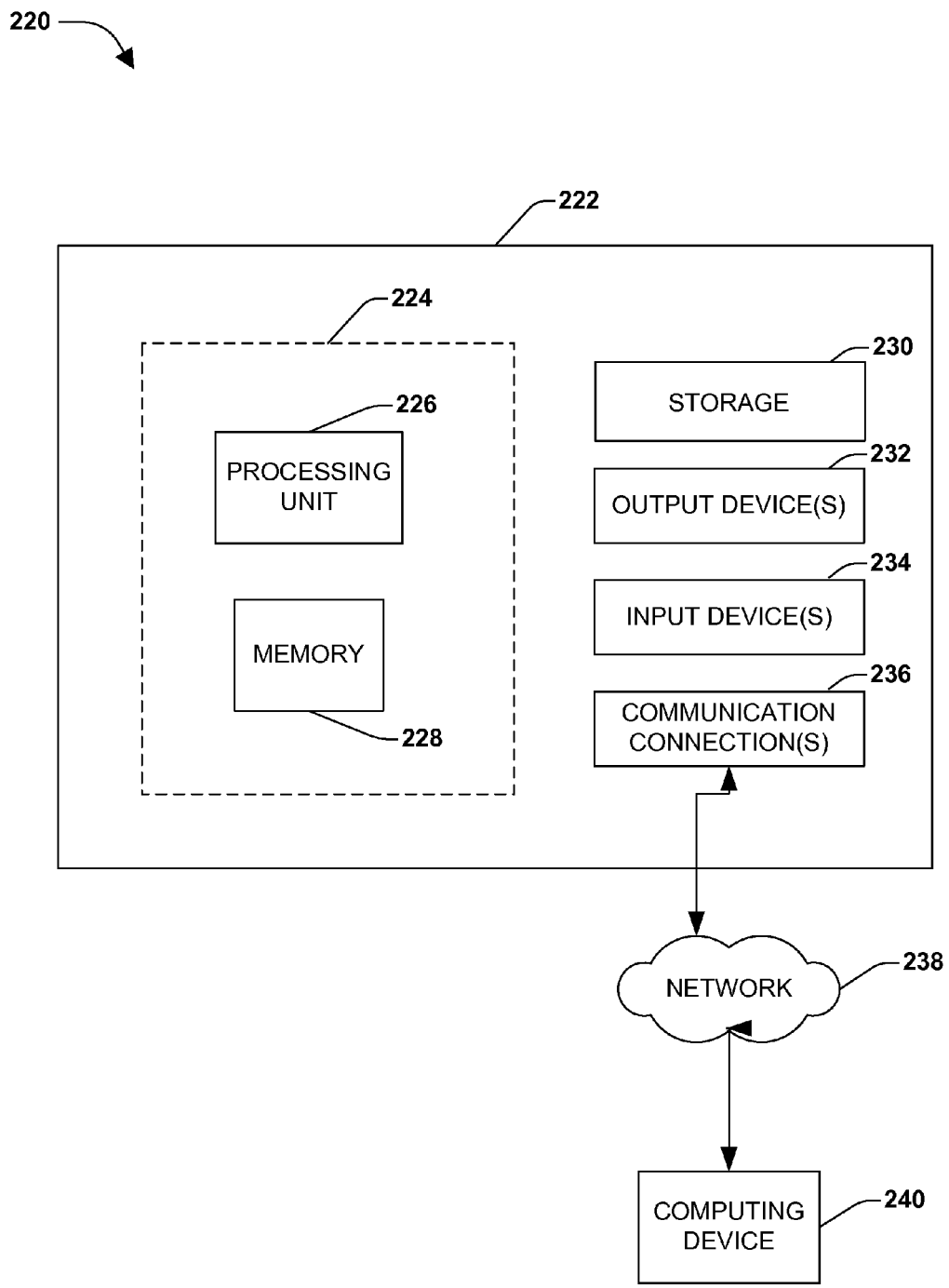
FIG. 14 illustrates an exemplary computing environment wherein one or more of the provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 220 comprising a computing device 222 configured to implement one or more embodiments provided herein. In one configuration, computing device 222 includes at least one processing unit 226 and memory 228. Depending on the exact configuration and type of computing device, memory 228 may be volatile (such as RAM, for example), non-volatile (such as ROM, flash memory, etc., for example) or some combination of the two. This configuration is illustrated in FIG. 14 by dashed line 224.

In other embodiments, device 222 may include additional features and/or functionality. For example, device 222 may also include additional storage (e.g., removable and/or non-removable) including, but not limited to, magnetic storage, optical storage, and the like. Such additional storage is illustrated in FIG. 14 by storage 230. In one embodiment, computer readable instructions to implement one or more embodiments provided herein may be in storage 230. Storage 230 may also store other computer readable instructions to implement an operating system, an application program, and the like. Computer readable instructions may be loaded in memory 228 for execution by processing unit 226, for example.

The term "computer readable media" as used herein includes computer storage media. Computer storage media includes volatile and nonvolatile, removable and non-removable media implemented in any method or technology for storage of information such as computer readable instructions or other data. Memory 228 and storage 230 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 222. Any such computer storage media may be part of device 222.

Device 222 may also include communication connection(s) 236 that allows device 222 to communicate with other devices. Communication connection(s) 236 may include, but is not limited to, a modem, a Network Interface Card (NIC), an integrated network interface, a radio frequency transmitter/receiver, an infrared port, a USB connection, or other interfaces for connecting computing device 222 to other computing devices. Communication connection(s) 236 may include a wired connection or a wireless connection. Communication connection(s) 236 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 222 may include input device(s) 234 such as keyboard, mouse, pen, voice input device, touch input device, infrared cameras, video input devices, and/or any other input device. Output device(s) 232 such as one or more displays, speakers, printers, and/or any other output device may also be included in device 222. Input device(s) 234 and output device(s) 232 may be connected to device 222 via a wired connection, wireless connection, or any combination thereof. In one embodiment, an input device or an output device from another computing device may be used as input device(s) 234 or output device(s) 232 for computing device 222.

Components of computing device 222 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 222 may be interconnected by a network. For example, memory 228 may be comprised of multiple physical memory units located in different physical locations interconnected by a network.

Those skilled in the art will realize that storage devices utilized to store computer readable instructions may be distributed across a network. For example, a computing device 240 accessible via network 238 may store computer readable instructions to implement one or more embodiments provided herein. Computing device 222 may access computing device 240 and download a part or all of the computer readable instructions for execution. Alternatively, computing device 222 may download pieces of the computer readable instructions, as needed, or some instructions may be executed at computing device 222 and some at computing device 240.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described is not to be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system configured to present to users at least one topical data feed comprising data items of at least two data feeds, respective data feeds provided by at least one data source, the system comprising:

a data item receiving component configured to, for respective data feeds, receive the data items from the data source of the data feed;

a topic identifying component configured to, for respective data items, identify at least one topic associated with the data item; and a topical data feed presenting component configured to:

receive from a user at least one topic, and for respective topics received from the user:

select a first data item of the data feed that explicitly references with the topic;

identify a second data item of the data feed that is associated with the first data item, that does not explicitly reference the topic, and that is contextually related to the topic through the first data item;

wherein identifying the second data item comprises performing a natural-language contextual analysis on the first data item and the second data item of the data feed to identify a contextual indicator of the topic in the first data item and the second data item;

generate a topical data feed comprising the first data item associated with the topic, and the second data item; and present the topical data feed to the user.

2. The system of claim 1, the data item receiving component comprising:

at least one data source parsing component configured to, for a data source type, parse data items of data feeds of data sources of the data source type; and a data source interface configured to, for respective data sources:
  identify the data source type of the data source, and
  invoke the data source parsing component for the data source type of the data source to parse the data items of the data source.

3. The system of claim 1:
the system having access to a data store configured to store data items respectively associated with at least one topic; and
the topical data feed presenting component configured to:
  upon receiving from the user the at least one topic, store the topic in the data store associated with the user; and
  upon receiving from the user a request for topical data feeds:
    retrieve from the data store the at least one topic in the data store associated with the user;
    generate the topical data feeds for respective topics; and
    present the topical data feeds to the user.

4. A method of presenting to users at least one topical data feed comprising data items of at least two data feeds, respective data feeds provided by at least one data source, the method performed on a device having a processor and comprising:
executing on the processor instructions configured to:
  for respective data feeds:
    receive the data items from the data source of the data feed, and
    for respective data items, identify at least one topic associated with the data item;
  receive from a user at least one topic; and
  for respective topics received from the user:
    select a first data item of the data feed that explicitly references associated with the topic;
    identify a second data item of the data feed that is associated with the first data item, that does not explicitly reference the topic, and that is contextually related to the topic through the first data item;
    wherein identifying the second data item comprises performing a natural-language contextual analysis on the first data item and the second data item of the data feed to identify a contextual indicator of the topic in the first data item and the second data item;
    generate a topical data feed comprising the first data item and the second data item; and
    present the topical data feed to the user.

5. The method of claim 4, receiving the data items from the data source of a data feed comprising: subscribing to the data source to receive data items of the data feed.

6. The method of claim 4:
at least one topic associated with at least one topical metadata item; and
identifying at least one topic associated with a data item comprising: identifying at least one metadata item of the data item that matches the topical metadata item of the topic.

7. The method of claim 4:
the topic having a topical identifier; and
identifying at least one topic associated with a data item comprising: identifying at least one topical identifier associated with the data item, the topical identifier indicating an association of the data item with the topic having the topical identifier.

8. The method of claim 4:
at least one data item comprising an expression; and
identifying at least one topic associated with the data item comprising: parsing the expression of the data item with a natural language parser to identify at least one topic referenced by the expression.

9. The method of claim 4, receiving a topic from a user comprising:
identifying at least one user descriptor of the user, and
based on the user descriptor, inferring at least one topic of interest to the user.

10. The method of claim 4:
at least one topic associated with at least one filter having at least one criterion for generating the topical data feed comprising the data items; and
generating the topical data feed comprising: generating the topical data feed comprising the data items associated with the topic, the data items selected according to the filter associated with the topic.

11. The method of claim 10:
at least one criterion of the filter specifying a score attributable to a data item matching the criterion; and
generating the topical data feed comprising:
  for respective data items, computing an aggregate score for the data item according to the at least one criterion of the filter; and
  generating the topical data feed comprising the data items associated with the topic, the data items ordered according to the aggregate scores of the respective data items.

12. The method of claim 4:
the instructions configured to, for respective topics, identify at least one user-specific data item accessible to a user and associated with the topic; and
generating the topical data feed comprising: generating a topical data feed comprising the data items associated with the topic and the at least one user-specific data item associated with the topic.

13. The method of claim 12:
at least one user-specific data item comprising an access-controlled data item that is accessible to the user; and
identifying the at least one user-specific data item comprising: accessing the access-controlled data item on behalf of the user.

14. The method of claim 12:
the device represented within a deployable computing environment comprising a second device configured to store the user-specific data item; and
identifying the at least one user-specific data item comprising: retrieving the user-specific data item from the second device through the deployable computing environment.

15. The method of claim 4, the instructions configured to remove from the topical data feed a first data item that is equivalent to a second data item of the topical data feed.

16. The method of claim 4, the instructions configured to, upon receiving at least one data item associated with a topic of a topical data feed after presenting the topical data feed to a user, update the topical data feed presented to the user.

17. The method of claim 16:
a first data item of the topical data feed having a responsive relationship with a second data item of the topical data feed; and
presenting the topical narrative comprising: presenting the first data item in the data feed with a responsive indicator associated with the second data item.

18. The method of claim 4, presenting a topical data feed to a user comprising:
- organizing the topical data feed according to a topical narrative, and
- presenting the topical narrative to the user.

19. A method of presenting to users at least one topical data feed comprising data items of at least two data feeds, respective data feeds provided by at least one data source, the method performed on a device having a processor and represented within a deployable computing environment comprising a second device configured to store a user-specific data item, the method comprising:
- executing on the processor instructions configured to:
  - for respective data feeds:
    - subscribing to the data source to receive data items of the data feed;
    - receive the data items from the data source of the data feed, and
    - for respective data items, identify at least one topic associated with the data item by at least one of:
      - identifying at least one metadata item of the data item that matches a topical metadata item associated with the topic,
      - identifying at least one topical identifier associated with the data item, the topical identifier indicating an association of the data item with a topical identifier of the topic;
      - parsing an expression of the data item with a natural language parser to identify at least one topic referenced by the expression; and
      - identifying as associated with the data item at least one topic associated with a second data item with which the data item is associated;
  - receive from a user at least one topic; and
  - for respective topics:
    - select at least one first data item of the data feeds that explicitly references at least one topic received from the user, the first data items selected according to at least one criterion of at least one filter associated with the topic, at least one criterion of the filter specifying a score attributable to a data item matching the criterion;
    - identify at least one second data item of the data feed that is associated with a first data item, that does not explicitly reference the topic, and that is contextually related to the topic through the first data item;
    - wherein identifying the second data item comprises performing a natural-language contextual analysis on the first data item and the second data item of the data feed to identify a contextual indicator of the topic in the first data item and the second data item;
    - for respective first data items and second data items selected for the topical data feed, compute an aggregate score for the data item according to the at least one criterion of the filter;
    - identify at least one user-specific data item stored on the second device and associated with the topic;
    - retrieving from the second device through the deployable computing environment at least one user-specific data item;
    - generate a topical data feed comprising the first data items, the second data items, and the at least one user-specific data item associated with the topic, the data items ordered according to the aggregate scores of the respective data items;
    - remove from the topical data feed a data item that is equivalent to another data item of the topical data feed;
    - organizing the topical data feed according to a topical narrative of the topic; and
    - present the topical narrative to the user; and
  - upon receiving at least one data item associated with a topic of a topical data feed after presenting the topical narrative to the user, update the topical narrative presented to the user.

* * * * *